(12) United States Patent
Engerman

(10) Patent No.: US 11,673,462 B2
(45) Date of Patent: Jun. 13, 2023

(54) ELECTRIC DRIVE AXLE WITH LUBRICATION SYSTEM

(71) Applicant: Dana Automotive Systems Group, LLC, Maumee, OH (US)

(72) Inventor: Eric M. Engerman, Plymouth, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 17/821,025

(22) Filed: Aug. 19, 2022

(65) Prior Publication Data

US 2022/0402342 A1 Dec. 22, 2022

Related U.S. Application Data

(62) Division of application No. 16/795,280, filed on Feb. 19, 2020, now Pat. No. 11,518,225.

(51) Int. Cl.
| | | |
|---|---|---|
| *F16H 57/04* | (2010.01) | |
| *B60K 1/00* | (2006.01) | |
| *B60K 17/04* | (2006.01) | |
| *B60K 17/16* | (2006.01) | |
| *F16D 13/52* | (2006.01) | |
| *F16D 25/062* | (2006.01) | |
| *F16D 25/0638* | (2006.01) | |
| *F16H 3/089* | (2006.01) | |
| *F16D 25/10* | (2006.01) | |
| *F16H 63/30* | (2006.01) | |

(52) U.S. Cl.
CPC .............. B60K 1/00 (2013.01); B60K 17/046 (2013.01); B60K 17/20 (2013.01); F16D 13/52 (2013.01); F16D 25/062 (2013.01); F16H 57/042 (2013.01); F16H 57/043 (2013.01); F16H 57/0426 (2013.01); B60K 2001/001 (2013.01); B60Y 2400/73 (2013.01); F16D 25/0638 (2013.01); F16D 25/10 (2013.01); F16H 3/089 (2013.01); F16H 63/3026 (2013.01)

(58) Field of Classification Search
CPC .. F16H 48/00–2048/426; F16H 57/043; F16H 57/042; B60K 2007/0061; B60K 1/00; B60K 17/046; B60K 17/20; F16D 25/062; F16D 13/52; F16D 25/0638; F16D 25/10
See application file for complete search history.

(56) References Cited

U.S. PATENT DOCUMENTS

| | | |
|---|---|---|
| 1,176,929 A | 3/1916 | Smith |
| 3,768,584 A | 10/1973 | King |
| 4,418,777 A | 12/1983 | Stockton |
| 4,615,231 A | 10/1986 | Takahashi |
| 5,620,387 A | 4/1997 | Janiszewski |

(Continued)

*Primary Examiner* — Charles A Fox
*Assistant Examiner* — Farhana Pervin
(74) *Attorney, Agent, or Firm* — McCoy Russell LLP

(57) ABSTRACT

Methods and systems for an electric drive axle of a vehicle are provided. An electric drive axle system includes, in one example a gear train configured to rotationally attach to an electric motor-generator, the gear train includes an output shaft having a clutch arranged thereon and configured to selectively rotationally couple a gear to the output shaft. The gear train further includes a lubrication channel extending between an output shaft and an axle shaft and including an outlet extending through the output shaft and opening into the clutch.

4 Claims, 13 Drawing Sheets

(56) References Cited

U.S. PATENT DOCUMENTS

| | | |
|---|---|---|
| 8,403,088 B2 | 3/2013 | Knoblauch et al. |
| 9,637,127 B1 | 5/2017 | Cooper |
| 11,148,526 B2 | 10/2021 | Engerman |
| 11,235,660 B2 | 2/2022 | Engerman |
| 11,236,804 B2 | 2/2022 | Engerman et al. |
| 2004/0185983 A1 | 9/2004 | Chung |
| 2007/0066440 A1 | 3/2007 | Kitahara et al. |
| 2010/0240485 A1 | 9/2010 | Strasser et al. |
| 2017/0210315 A1 | 7/2017 | Nakajima et al. |
| 2018/0010682 A1 | 1/2018 | Pritchard et al. |
| 2019/0113125 A1 | 4/2019 | Omi et al. |
| 2019/0145465 A1 | 5/2019 | Olason |
| 2020/0182293 A1 | 6/2020 | Sakazaki et al. |
| 2021/0252976 A1 | 8/2021 | Nahrwold |
| 2021/0252977 A1 | 8/2021 | Engerman |
| 2021/0252983 A1 | 8/2021 | Nahrwold et al. |
| 2021/0253101 A1 | 8/2021 | Nahrwold |
| 2021/0254675 A1 | 8/2021 | Engerman |
| 2021/0254677 A1 | 8/2021 | Wesolowski et al. |

ELECTRIC DRIVE AXLE WITH LUBRICATION SYSTEM

CROSS REFERENCE TO RELATED APPLICATION

The present application is a divisional of U.S. Non-Provisional patent application Ser. No. 16/795,280, entitled "ELECTRIC DRIVE AXLE WITH LUBRICATION SYSTEM", and filed on Feb. 19, 2020. The entire contents of the above-listed application are hereby incorporated by reference for all purposes.

FIELD

The present disclosure relates to electric drive axles in vehicles, and more particularly to lubrication systems in the electric drive axles.

BACKGROUND

Electrified axles have been incorporated into electric as well as hybrid vehicles to provide or augment vehicle propulsion. The electrified axles have included gearboxes providing a desired gear reduction between the electric motor and the drive wheels. Drive axles have also incorporated lubrication systems routing lubricant to gearings and other components to reduce friction in the system. However, drive axle compactness may affect the ability of the lubrication system to meet component lubrication needs. Therefore, axle packaging compactness and component lubrication needs may be, in certain circumstances, competing design characteristics. Lubrication routing issues may be particularly challenging in drive axles with tightly packaged planetary gear sets.

SUMMARY

To overcome at least some of the aforementioned drawbacks, an electric drive axle system is provided. In one example, the electric drive axle system includes a gear train configured to rotationally attach to an electric motor-generator. The gear train includes an output shaft having a clutch arranged thereon and configured to selectively rotationally couple a gear to the output shaft. The gear train further includes a lubrication channel extending between an output shaft and an axle shaft and including an outlet extending through the output shaft and opening into the clutch. In this way, lubricant is efficiently routed to the clutch in a compact drive axle arrangement.

In another example, the gear may include a tapered inner surface configured to outflow the lubricant from the clutch. Consequently, lubricant may be radially routed through the clutch and spaced efficiently expelled through a lubrication conduit integrated into a section of the gear.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-16 and 18-21 are drawn approximately to scale. However, other relative dimensions of the components may be used in other embodiments.

DETAILED DESCRIPTION

A lubrication system for a friction clutch in an electric drive axle is described herein. The lubrication system efficiently routes lubricant to the friction clutch via a lubrication channel in a space between an outer circumference of an axle shaft and an inner circumference of an output shaft of a gearbox. In one example, the lubricant may be routed through a first outlet of the lubrication channel extending radially through the output shaft and a friction disk carrier to supply friction disks in the clutch with a targeted amount of lubricant. In this way, the lubrication needs of the friction clutch may be met in a space efficient manner. The lubrication system may further include, in one example, a second outlet of the lubrication channel extending through the output shaft into a region adjacent to a one-way clutch coupled to the output shaft. In this way, the lubrication needs of additional clutches in the electric drive axle may be met, if desired.

Figure 1:
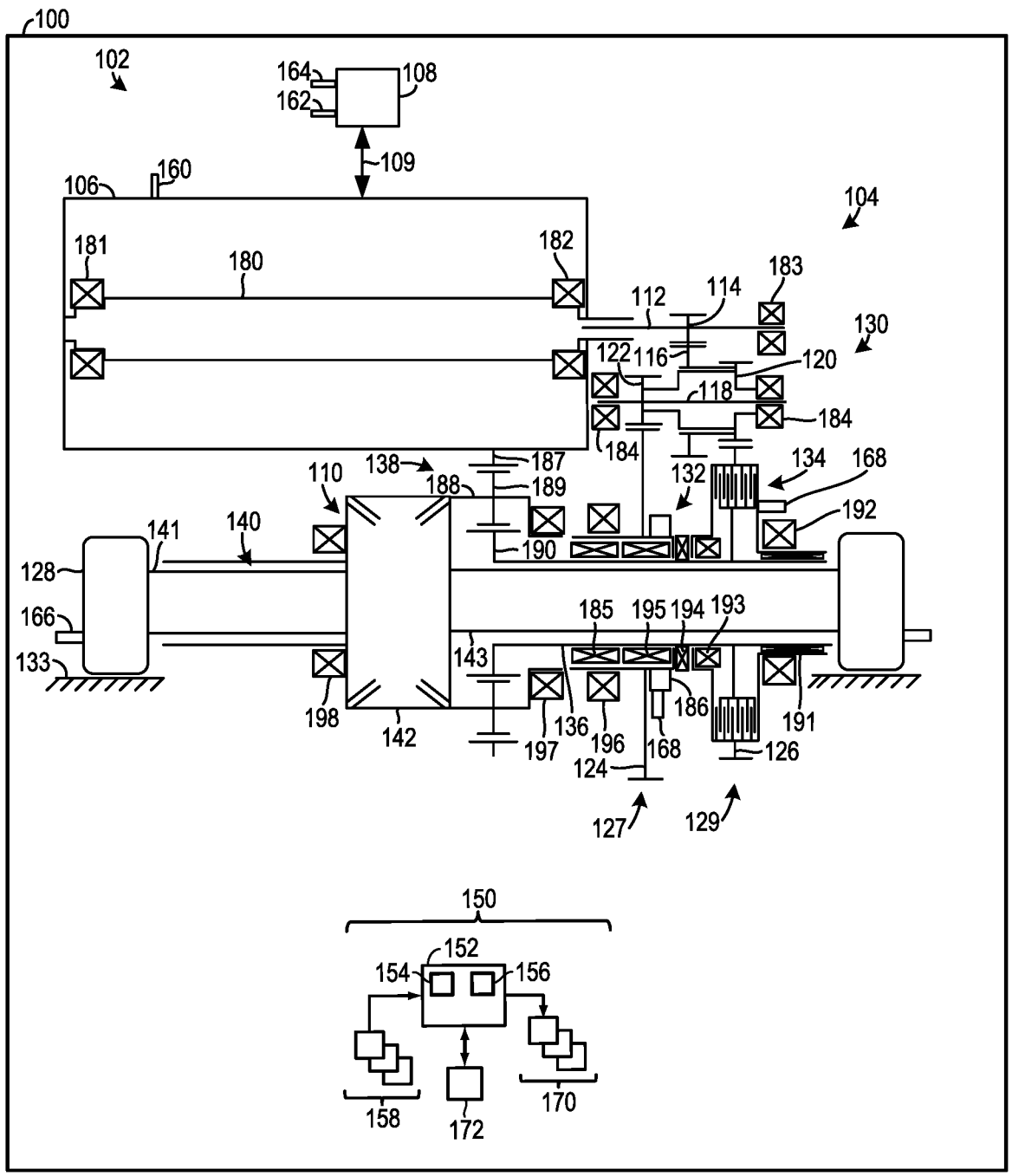
FIG. 1 is a schematic representation of a vehicle including an electric drive axle system.

FIG. 1 schematically illustrates a vehicle with an electric drive axle system designed with multiple gear ratios. FIGS.

Figure 5:
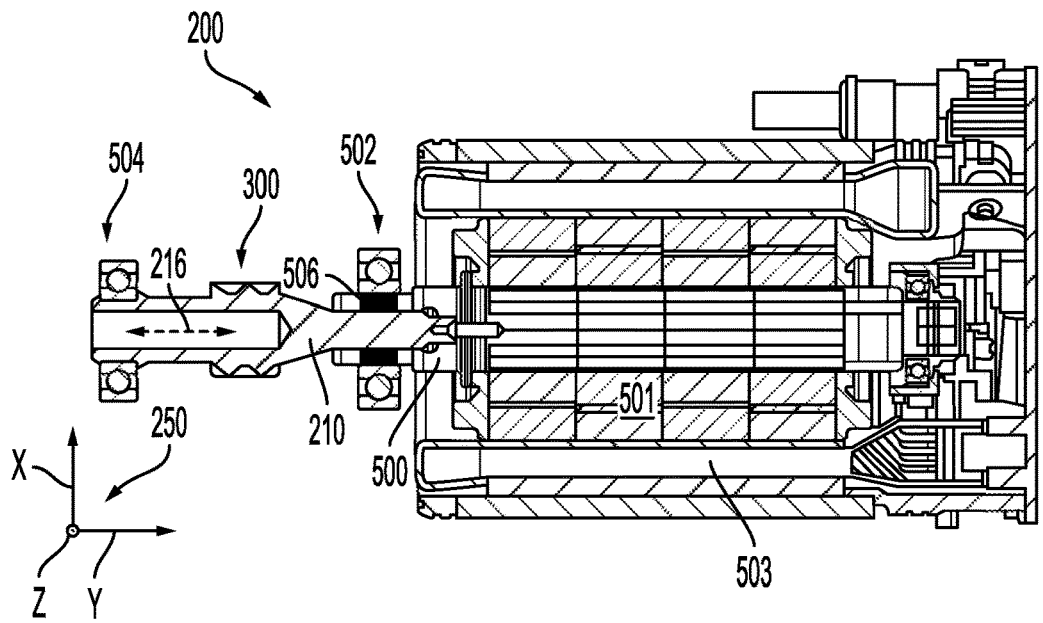
FIG. 5 shows a cross-sectional view of an electric motor-generator and input shaft in the electric drive axle system, depicted in FIG. 2.
Figure 6:
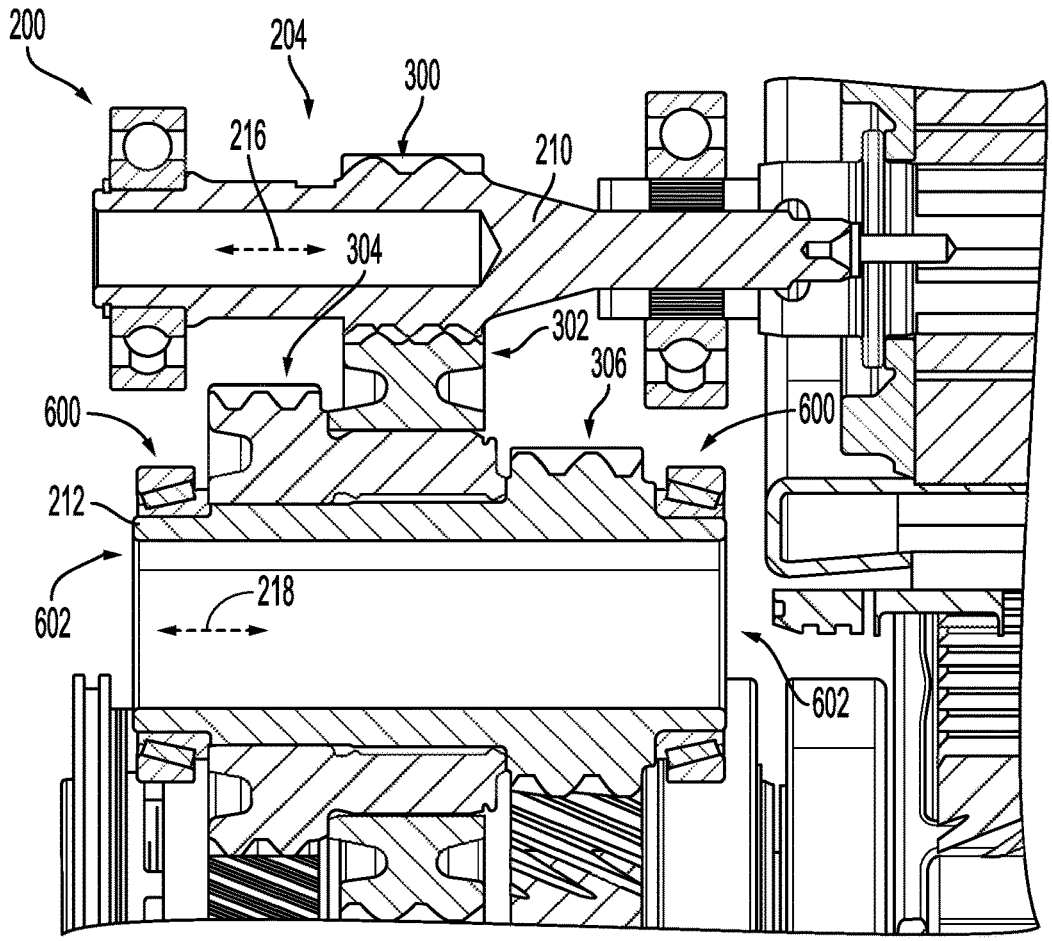
FIG. 6 shows a cross-sectional view of an intermediate shaft in the gear train of the electric drive axle system, depicted in FIG. 2.
Figure 7:
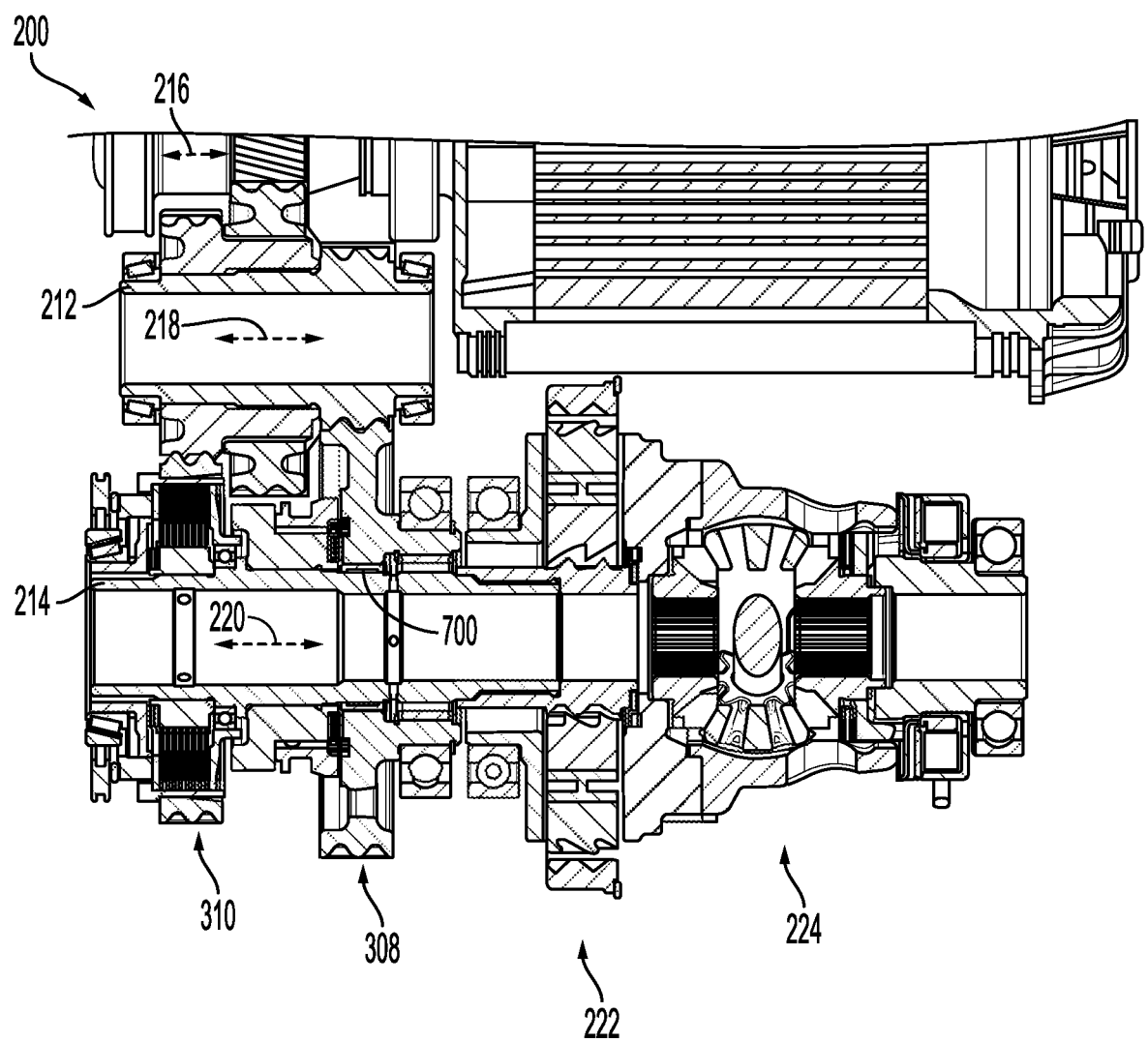
FIG. 7 shows a cross-sectional view of an output shaft, planetary gear assembly, and differential in the gear train of the electric drive axle system, depicted in FIG. 2.
Figure 8:
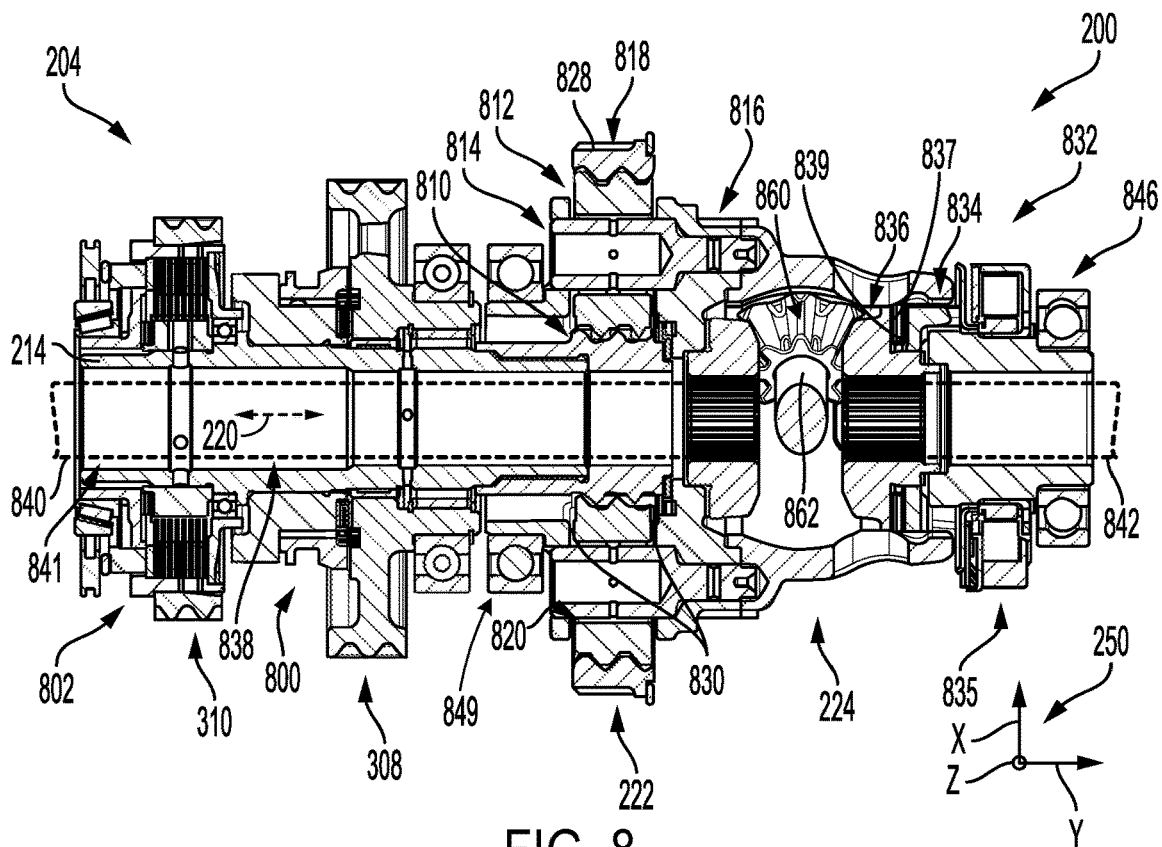
FIG. 8 shows a detailed view of the output shaft, planetary gear assembly, and differential in the gear train of the electric drive axle system, depicted in FIG. 2.
Figure 9:
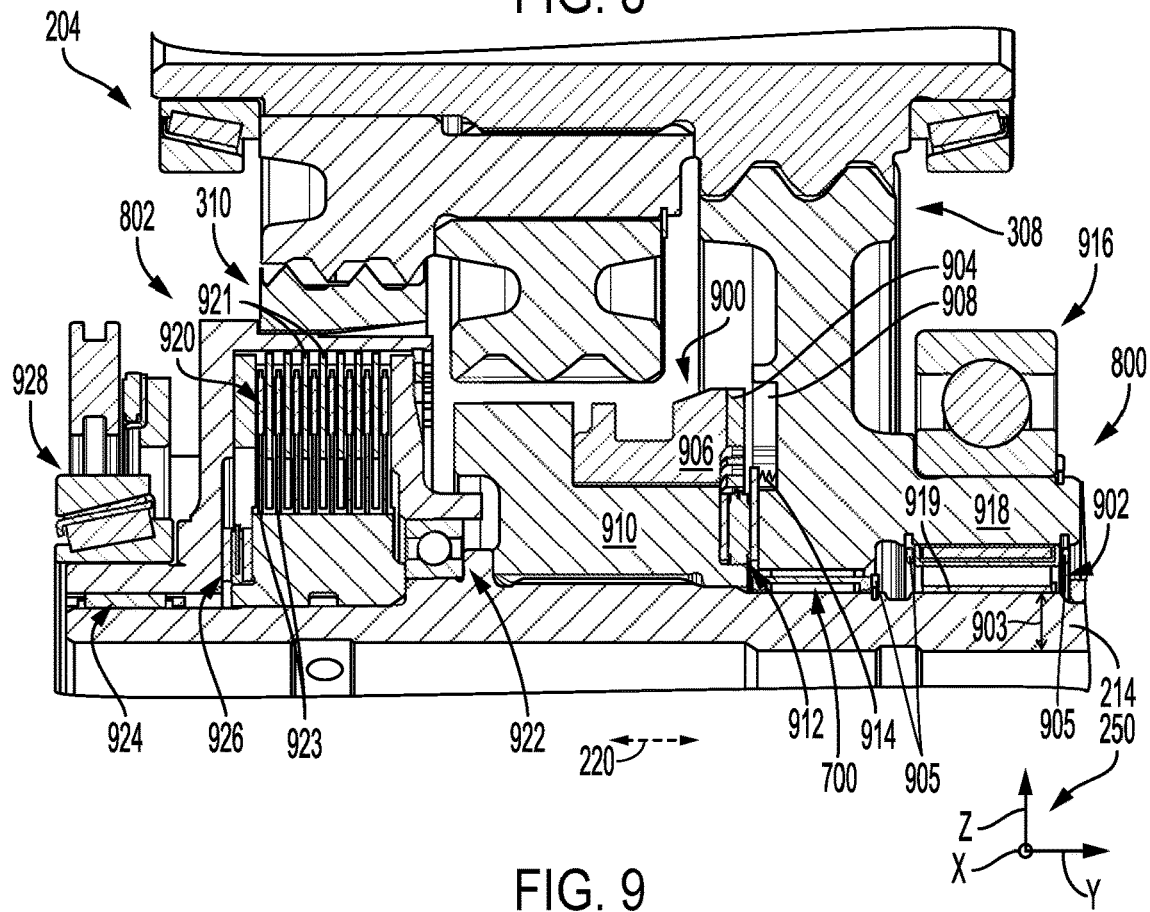
FIG. 9 shows a detailed view of the clutch assemblies in the gear train of the electric drive axle system, depicted in FIG. 2.
Figure 10:
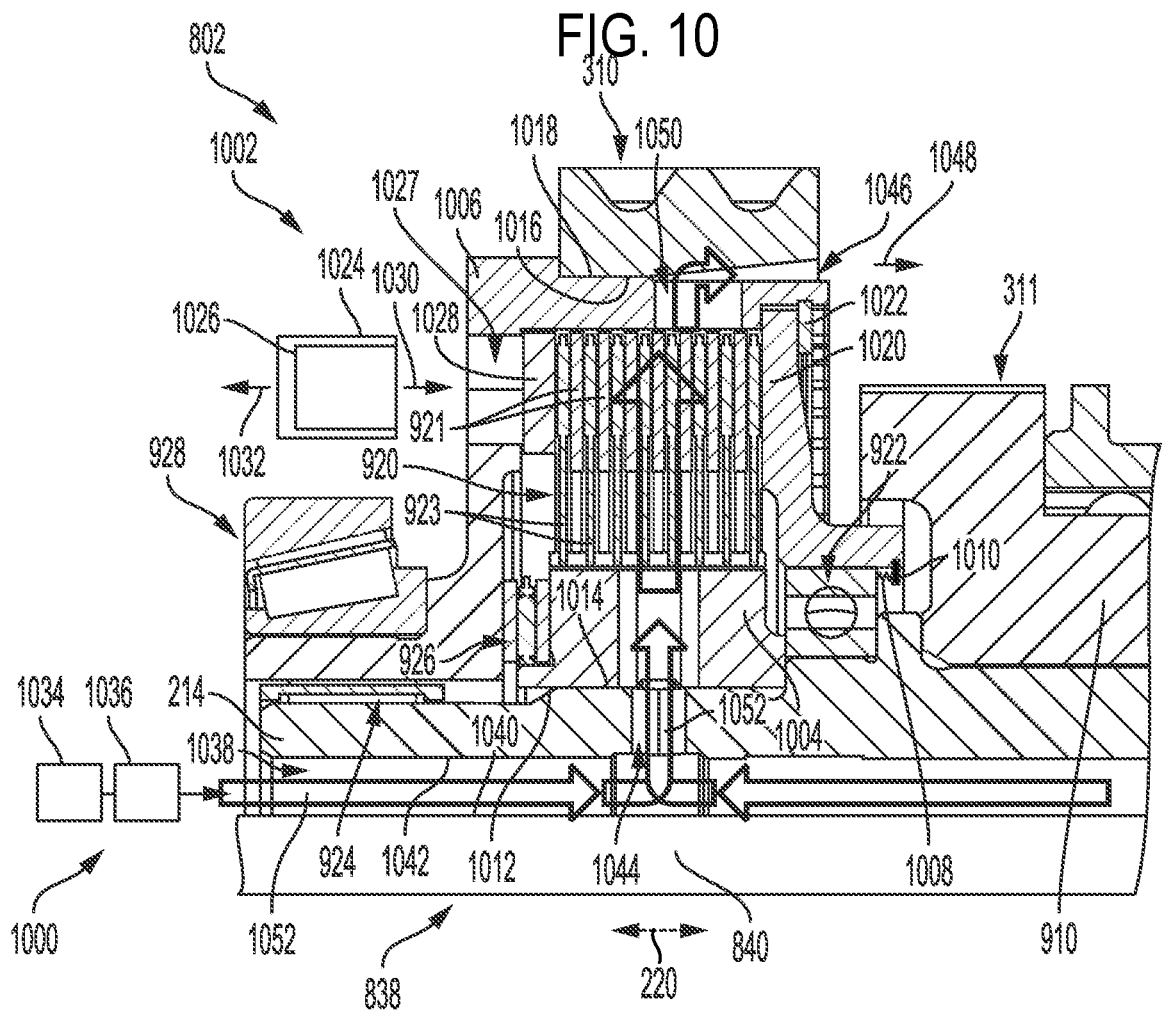
FIG. 10 shows a detailed view of the second clutch assembly included in the electric drive axle, depicted in FIG. 9.
Figure 11:
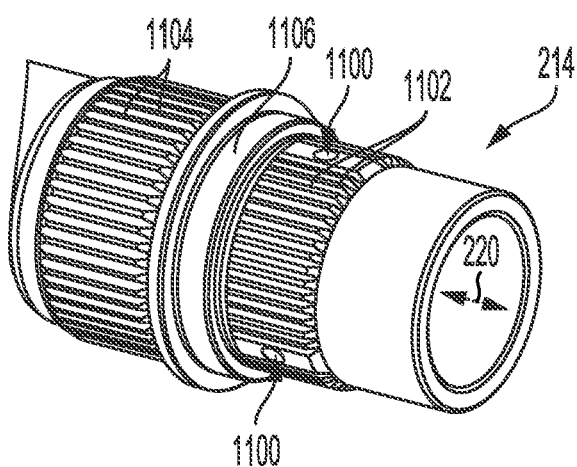
FIG. 11 shows a detailed view of a section of the output shaft, shown in FIG. 10.
Figure 12:
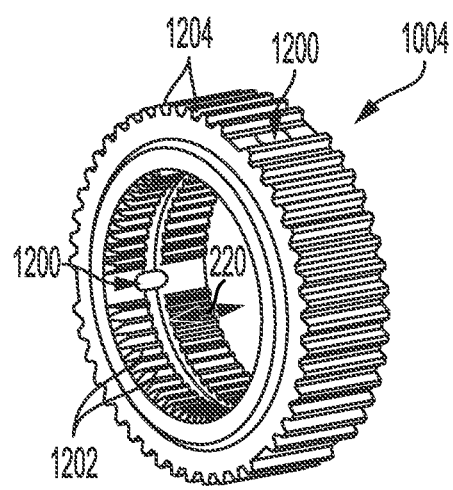
FIG. 12 shows a detailed view of a friction disk carrier included in the second clutch assembly, depicted in FIG. 10.
Figure 13:
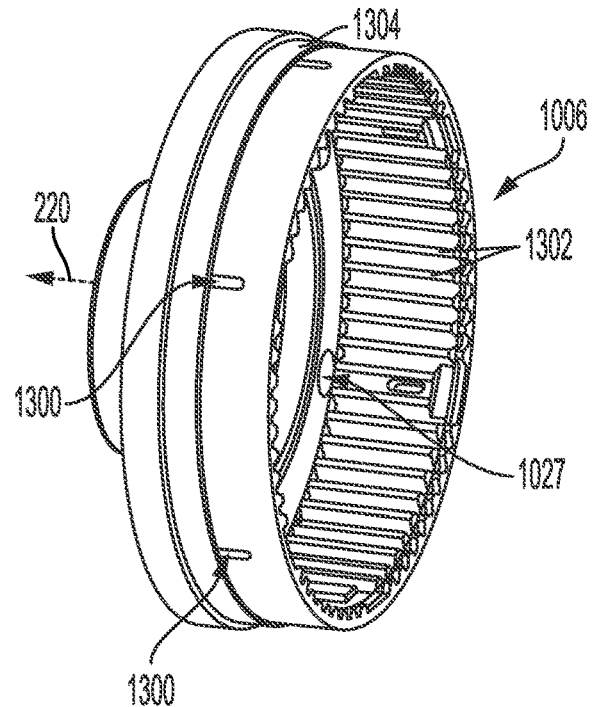
FIG. 13 shows a detailed illustration of a clutch drum included in the second clutch assembly, depicted in FIG. 10.
Figure 14:
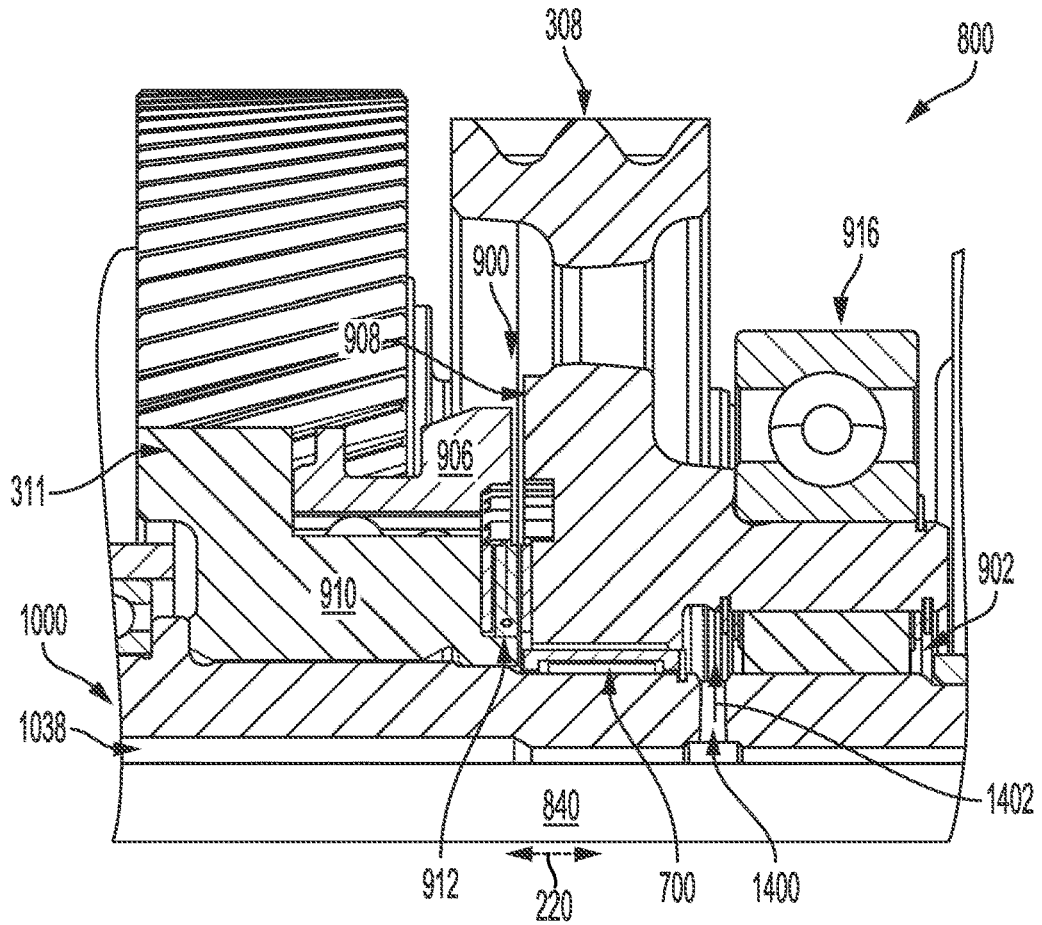
FIG. 14 shows a detailed view of the first clutch assembly, depicted in FIG. 9.
Figure 15:
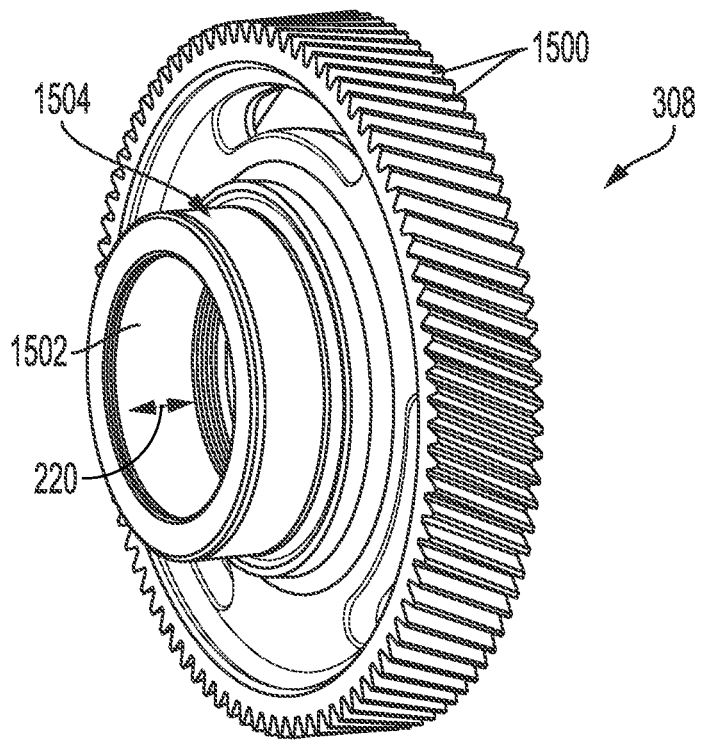
FIGS. 15-16 show detailed view of the fifth gear and the dog clutch teeth corresponding to the first clutch assembly shown in FIG. 9.
Figure 16:
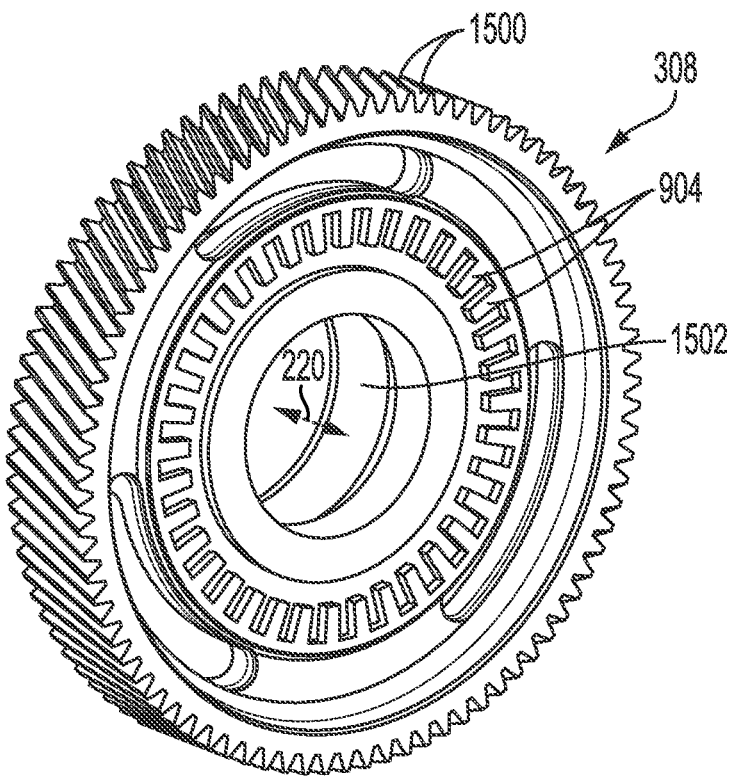
Figure 17:
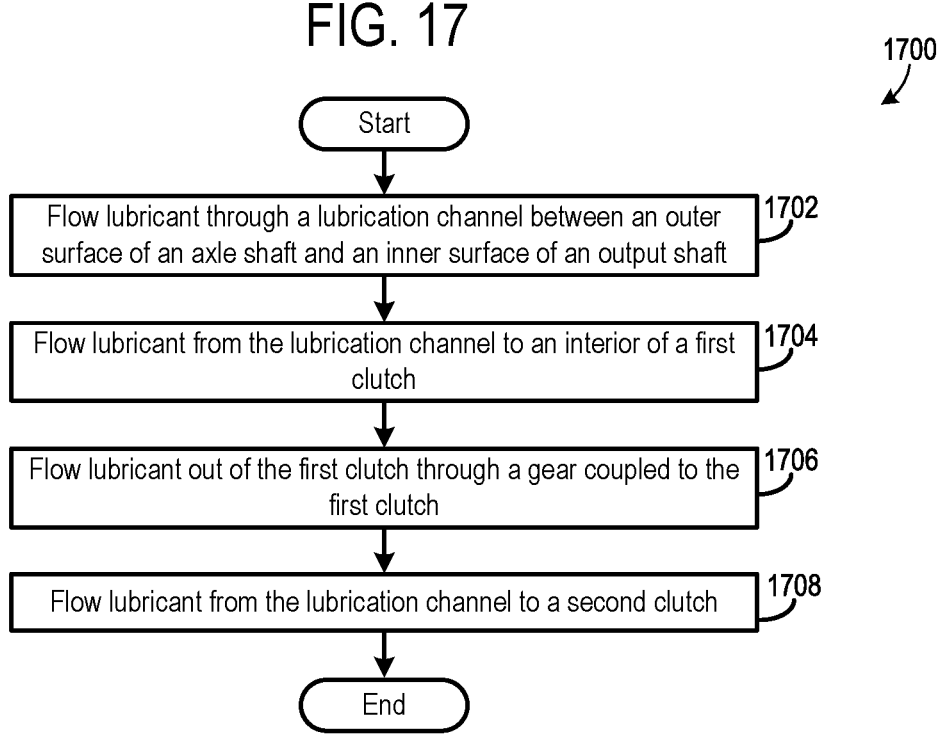
FIG. 17 shows a method for operation of a lubrication system in an electric drive axle.
Figure 18:
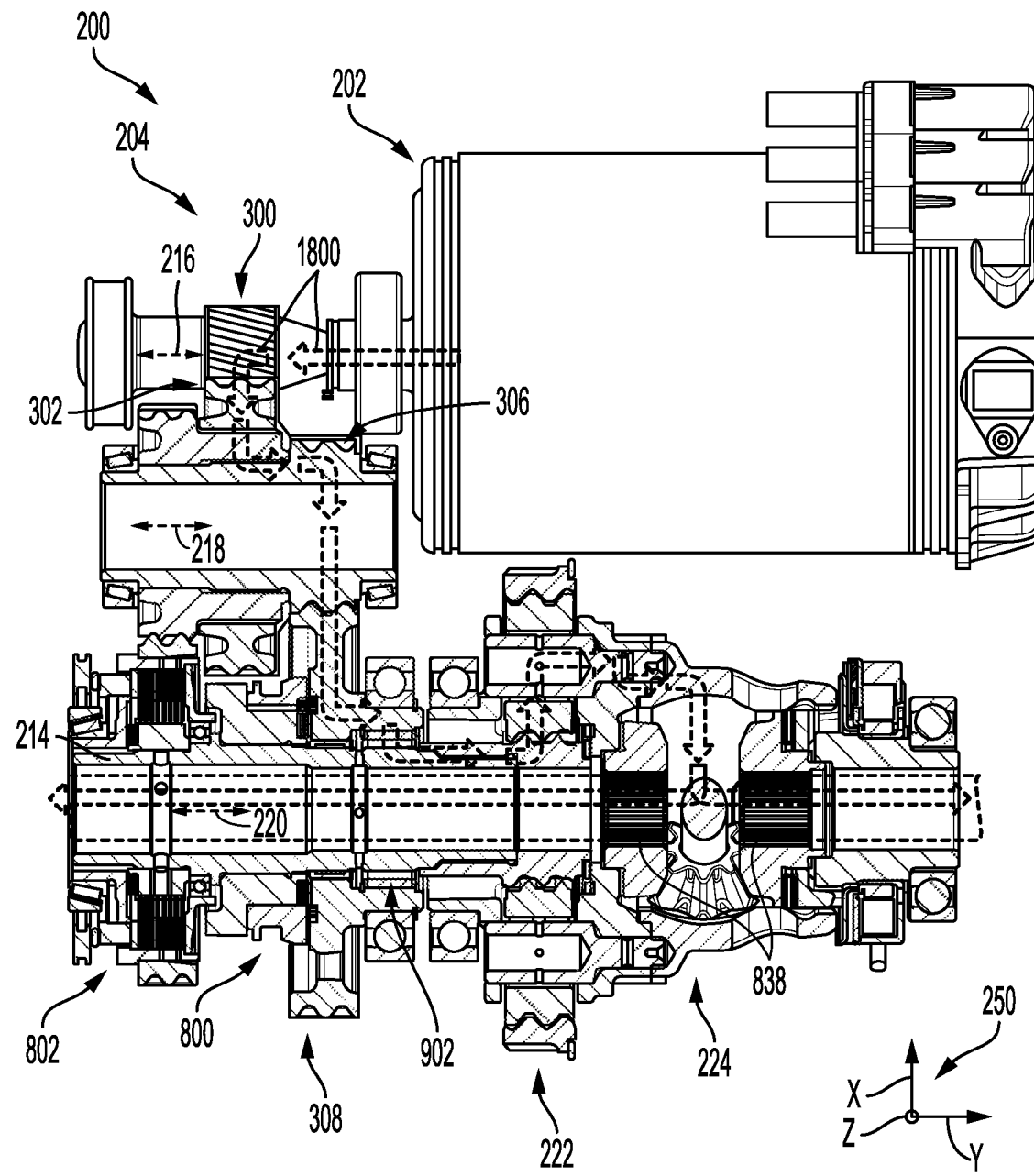
FIGS. 18-20 show power paths for different operating modalities of the electric drive axle system, depicted in FIG. 2.
Figure 19:
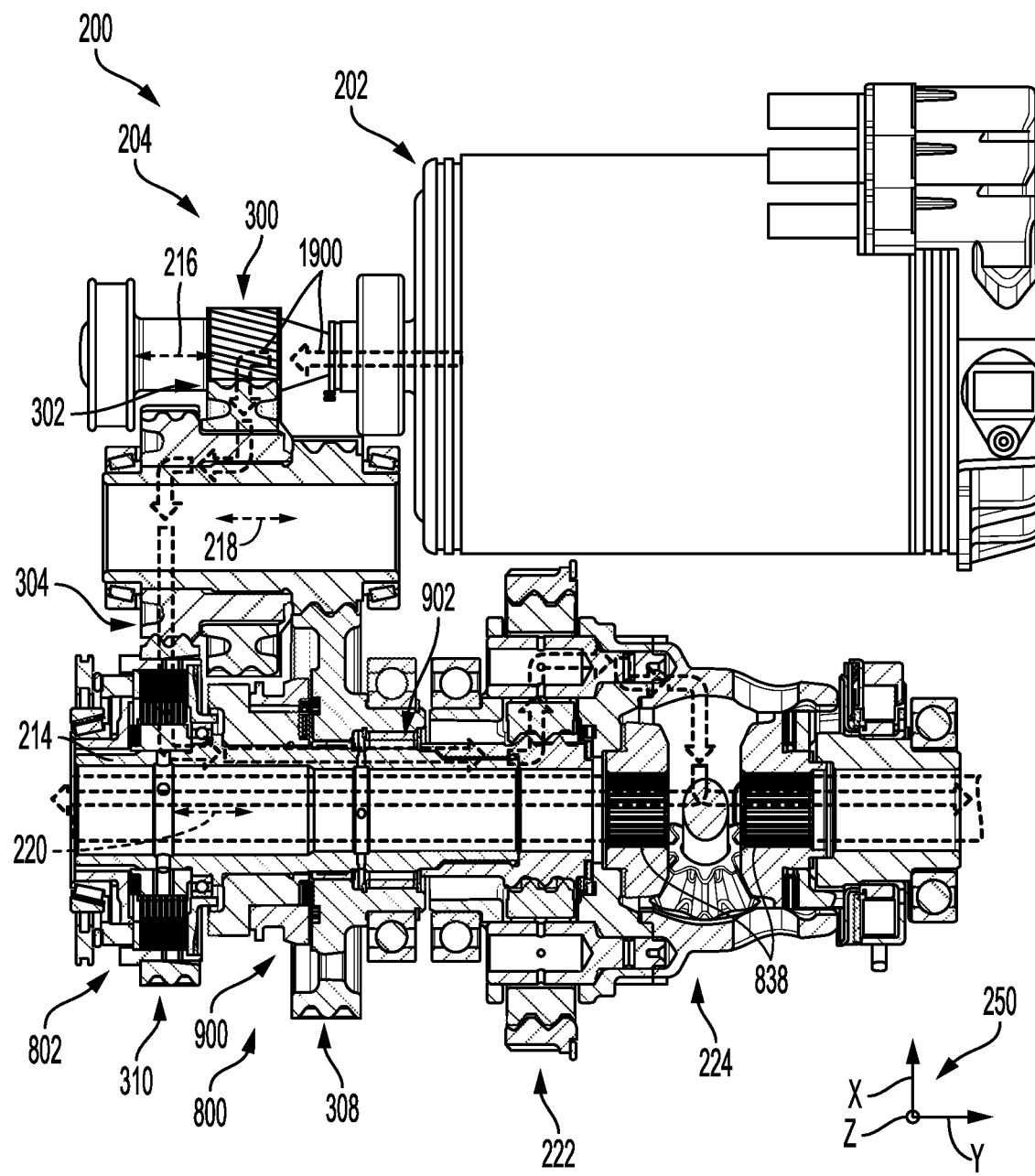
Figure 20:
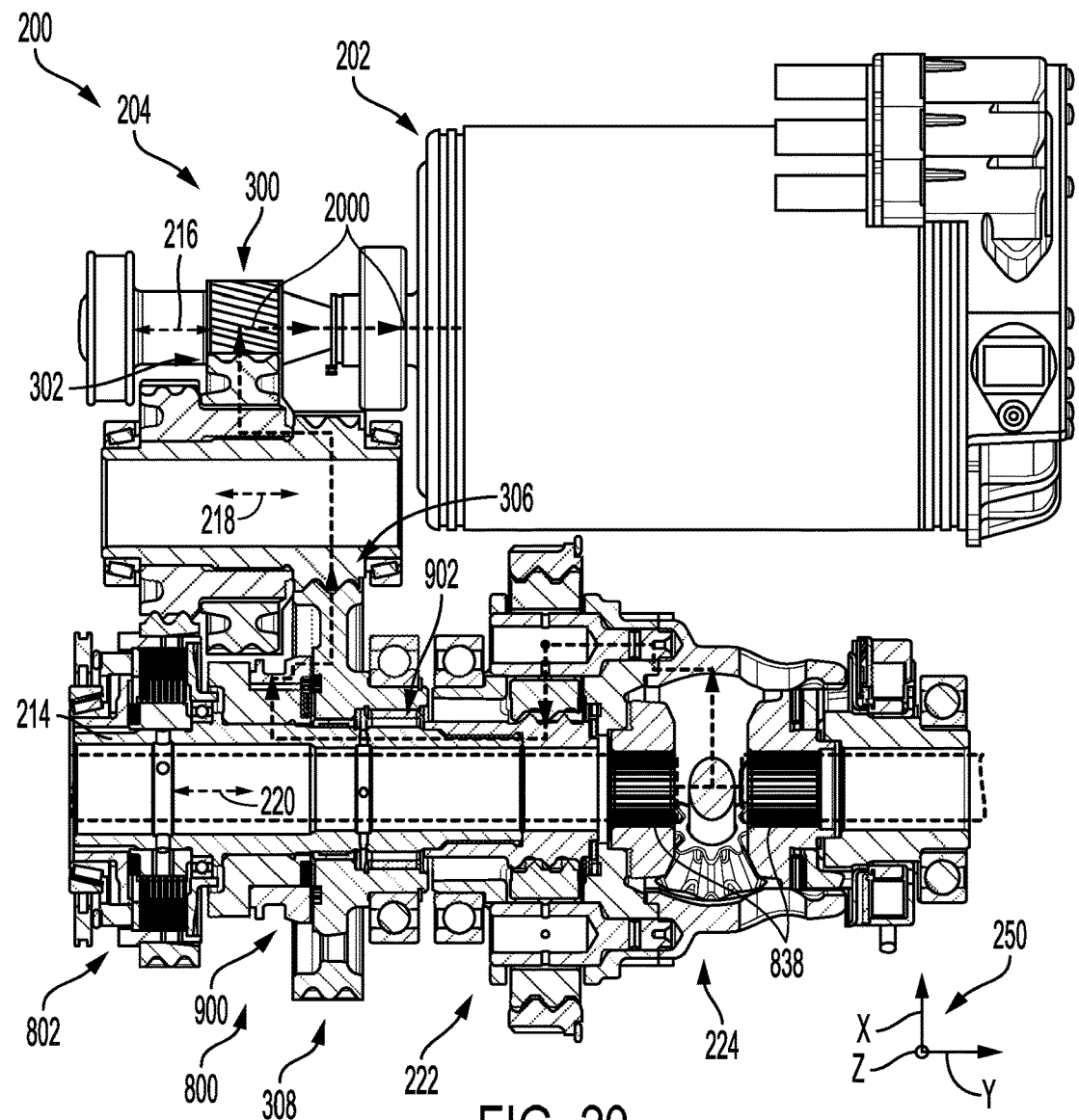
Figure 21:
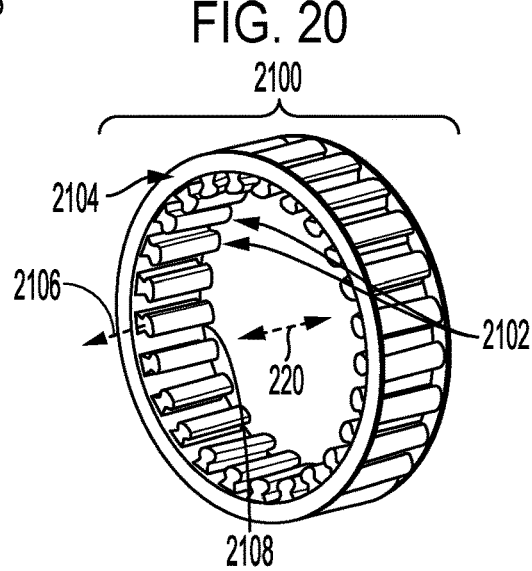
FIG. 21 shows an example of a one-way clutch.

2-4 illustrate different views of an example of an electric drive axle system. FIG. 5 shows a cross-sectional view of an electric motor-generator included in the electric drive axle system, shown in FIG. 4. FIG. 6 shows a cross-sectional view of an input shaft and intermediate shaft included in a gear train in the electric drive axle system, shown in FIG. 4. FIG. 7 shows a cross-sectional view of an intermediate shaft and an output shaft in the gear train in the electric drive axle system, shown in FIG. 4. FIG. 8 shows a cross-sectional view of the output shaft included in the gear train in the electric drive axle system, shown in FIG. 4. FIG. 9 shows a detailed view of clutch assemblies in the electric drive axle system, shown in FIG. 4. FIG. 10 shows a detailed view of the second clutch assembly included in the electric drive axle, shown in FIG. 9. FIG. 11 shows a detailed view of a section of the output shaft, shown in FIG. 10. FIG. 12 shows a detailed view of a friction disk carrier included in the second clutch assembly, shown in FIG. 10. FIG. 13 shows a detailed illustration of a clutch drum included in the second clutch assembly, shown in FIG. 10. FIG. 14 shows a detailed view of the first clutch assembly, shown in FIG. 9. FIGS. 15-16 show detailed view of the fifth gear and the dog clutch teeth corresponding to the first clutch assembly shown in FIG. 9. FIG. 17 shows a method for operation of a lubrication system in an electric drive axle. FIGS. 18-20 show exemplary gear train power paths occurring during different modes of system operation. FIG. 21 shows an exemplary embodiment of a one-way clutch. Exemplary as expressed herein does not give any sort of preferential indication but rather denotes potential aspects of the system.

FIG. 1 shows a schematic depiction of a vehicle 100 having an electric drive axle system 102 with a gear train 104 and an electric motor-generator 106. The stick diagram of FIG. 1 provides a high-level topology of the vehicle, gear train, and corresponding components. However, it will be understood that the vehicle, gear train, and corresponding components have greater structural complexity than is captured in FIG. 1. The structural details of various facets of the gear train 104 are illustrated, by way of example, in greater detail herein with regard to FIGS. 2-21.

The electric motor-generator 106 is electrically coupled to an energy storage device 108 (e.g., battery, capacitor, and the like). Arrows 109 signify the energy transfer between the electric motor-generator 106 and the energy storage device 108 that may occur during different modes of system operation. The electric motor-generator 106 may include conventional components for generating rotational output (e.g., forward and reverse drive rotational output) and/or electrical energy for recharging the energy storage device 108 such as a rotor electromagnetically interacting with a stator, to provide the aforementioned energy transfer functionality. The electric motor-generator 106 is shown including a rotor shaft 180 with a first bearing 181 and a second bearing 182 coupled thereto. The first bearing 181 may be a fixed bearing and the second bearing 182 may be a floating bearing. Although the second bearing 182 is shown positioned within the motor-generator, it will be understood that in some embodiments, bearing 182 may be coupled to the input shaft to facilitate rotation thereof. Other bearing arrangements with regard to the motor-generator have been contemplated such as arrangements with alternate quantities and/or types of bearings.

The vehicle may take a variety of forms in different embodiments. For example, the vehicle 100 may be hybrid vehicle where both the electric motor-generator 106 and an internal combustion engine (not shown) are utilized for motive power generation. For instance, in one use-case hybrid vehicle configuration, the internal combustion engine may assist in recharging the energy storage device 108, during certain conditions. In another use-case hybrid vehicle configuration, the internal combustion engine may be configured to provide rotational energy to a differential 110 or other suitable locations in the gear train 104. In yet another use-case hybrid vehicle configuration, the engine may provide rotational input to another drive axle (not shown). Further, in other examples, the vehicle may be a battery electric vehicle (BEV) where the internal combustion engine is omitted.

The rotor shaft 180 of the electric motor-generator 106 is coupled to an input shaft 112. For instance, the rotor shaft 180 may be transition fit, slip fit, mechanically attached, in splined engagement, combinations thereof, etc., with an end of the input shaft 112. A first gear 114 is positioned or formed on the input shaft 112. A bearing 183 is shown coupled to the input shaft 112. The bearing 183 may be a fixed bearing, in one example. However, in other examples, the bearing 183 may be another suitable type of bearing or in some cases may be omitted from the system.

A second gear 116 is rotationally coupled to the first gear 114 and resides on an intermediate shaft 118. As described herein, rotational coupling between gears or other components may include an interface between the gears where teeth of the gears mesh to facilitate rotational energy transfer therebetween. As such, rotational coupling of the components allows rotational energy transfer to be transferred between the corresponding components. Conversely, rotational decoupling may include a state between two components when rotational energy is substantially inhibited from being transferred between the components.

A third gear 120 and a fourth gear 122 are additionally included on the intermediate shaft 118, although other gearing arrangements have been envisioned. Bearings 184 (e.g., tapered roller bearings) are coupled to either axial end of the intermediate shaft 118 to support the shaft and facilitate rotation thereof. The tapered roller bearings may decrease the axle package width when compared to other types of bearing such as ball bearings. However, other suitable intermediate shaft bearing types and/or arrangements have been envisioned. The bearing arrangement on the intermediate shaft as well as the other bearing arrangements described herein may be selected based on expected shaft loading (e.g., radial and thrust loading), gear size, shaft size, etc.

Continuing with the gear train description, the fourth gear 122 is rotationally coupled to a fifth gear 124 and the third gear 120 is rotationally coupled to a sixth gear 126. The first gear 114, the second gear 116, the third gear 120, the fourth gear 122, the fifth gear 124, and the sixth gear 126 are included in a gear assembly 130, in the illustrated embodiment. However, the gear assembly may include an alternate number of gears and/or have a different layout, in other embodiments. The number of gears in the assembly and the assembly layout may be selected based on end-use design goals related to desired gear range and packaging, for instance.

The first gear 114, the second gear 116, the fourth gear 122, and the fifth gear 124, may be included in a first gear set 127. Additionally, the first gear 114, the second gear 116, third gear 120, and the sixth gear 126, may be included in a second gear set 129. The first gear set 127 may have a higher gear ratio than the second gear set 129, in one example. However, other gear arrangements in the different gear sets may be used, in other examples. Clutch assemblies in the system 102 allow the first gear set 127 or the second gear set 129 to be placed in an operational state. To elaborate, the clutch assemblies allow the gear ratio delivered to drive wheels 128 on driving surfaces 133, by way of the gear assembly 130, a planetary gear assembly 138, and the differential 110, to be adjusted. For instance, the clutch assemblies may be operated to engage the first gear set 127, during certain conditions (e.g., towing, lower speed vehicle operation, etc.), and engage the second gear set 129, during other conditions (e.g., higher speed vehicle operation). As such, the system may transition between the different gear sets based on vehicle operating conditions, driver input, etc. In this way, the gear train has distinct selectable gear ratios, allowing the gear train to be adapted for different driving conditions, as desired. It will be appreciated that the gear ratio adjustability may also be utilized to increase electric motor efficiency, in some cases.

The system 102 may specifically include a first clutch assembly 132 and a second clutch assembly 134. The first clutch assembly 132 is configured to rotationally couple and decouple the fifth gear 124 from an output shaft 136. Likewise, the second clutch assembly 134 functions to rotationally couple and decouple the sixth gear 126 from the output shaft 136. The first clutch assembly 132 may include a one-way clutch 185 (e.g., sprag clutch) and a locking clutch 186 working in conjunction to accomplish the coupling/decoupling functionality, in a compact arrangement. However, other clutch designs have been contemplated, such as a friction clutch (e.g., wet friction clutch), a hydraulic clutch, an electromagnetic clutch, and the like. The structure and function of the one-way and locking clutches are described in greater detail herein. The second clutch assembly 134 may be a wet friction clutch providing smooth engagement/disengagement, in one embodiment. However, in other examples, the second clutch assembly 134 may include additional or alternate types of suitable clutches (e.g., hydraulic, electromagnetic, etc.).

The output shaft 136 is rotationally coupled to the planetary gear assembly 138, in the illustrated embodiment. The planetary gear assembly 138 may include an annulus 187 also referred to as a ring gear, a carrier 188 with planet gears 189 mounted thereon, and a sun gear 190 providing a space efficient design capable of providing a relatively high gear ratio in comparison to non-planetary arrangements. In the illustrated embodiment, the sun gear 190 is rotationally coupled to the output shaft 136 and the carrier 188 is rotationally coupled to the differential 110 (e.g., a differential case). However, in alternate examples, different gears in the planetary assembly may be rotationally coupled to the output shaft and the differential. Further, in one example, the components of the planetary gear assembly 138 may be non-adjustable with regard to the components that are held stationary and allowed to rotate. Thus, in one-use case example, the annulus 187 may be held substantially stationary and the carrier 188, planet gears 189, and the sun gear 190 and the gears stationary/rotational state may remain unchanged during gear train operation. In the illustrated embodiment, the annulus 187 is fixedly coupled to the motor-generator housing, to increase system space efficiency. However, the annulus may be fixedly coupled to other vehicle structures, in other instances. By using a non-adjustable planetary assembly, gear train operation may be simplified when compared to planetary arrangements with gears having rotational state adjustability. However, adjustable planetary arrangements may be used in the system, in other embodiments.

Various bearings may be coupled to the output shaft 136 and the planetary gear assembly 138 to enable rotation of components coupled to the shaft and assembly and in some cases support the components with regard to radial and/or thrust loads. A bearing 191 (e.g., needle roller bearing) is shown coupled to the output shaft 136 and the second clutch assembly 134. Additionally, a bearing 192 (e.g., tapered roller bearing) is shown coupled to the second clutch assembly 134. A bearing 193 (e.g., floating bearing) is also shown coupled to the second clutch assembly 134 and the output shaft 136. A bearing 194 (e.g., thrust bearing) may also be positioned axially between and coupled to the sixth gear 126 and the first clutch assembly 132. A bearing 196 (e.g., fixed bearing) may also be coupled to the one-way clutch 185. Additionally, a bearing 197 (e.g., ball bearing) is shown coupled to the planetary gear assembly 138 and a bearing 198 (e.g., ball bearing) is shown coupled to the differential case 142. However, other suitable bearing arrangements have been contemplated, such as arrangements where the quantity and/or configurations of the bearings are varied.

Additionally, FIG. 1 depicts the planetary gear assembly 138 directly rotationally coupled to the differential 110. Directly coupling the planetary gear assembly to the differential increases system compactness and simplifies system architecture. In other examples, however, intermediate gearing may be provided between the planetary gear assembly and the differential. In turn, the differential 110 is designed to rotationally drive an axle 140 coupled to the drive wheels 128. The axle 140 is shown including a first shaft section 141 and a second shaft section 143 coupled to different drive wheels 128. Furthermore, the axle 140 is shown arranged within (e.g., co-axial with) the output shaft 136 which allows more space efficient design to be achieved. However, offset axle-output shaft arrangements may be used, in other examples.

Further in one example, the axle 140 may be a beam axle. A beam axle, also referred to in the art as a solid axle or rigid axle, may be an axle with mechanical components structurally supporting one another and extending between drive wheels coupled to the axle. Thus, wheels coupled to the axle may move in unison when articulating, during, for example, vehicle travel on uneven road surfaces. For instance, the beam axle may be a structurally continuous axle spanning the drive wheels on a lateral axis, in one embodiment. In another embodiment, the beam axle may include co-axial shafts receiving rotational input from different gears in the differential and structurally supported by the differential.

The differential 110 may include a case 142 housing gearing such as pinion gears, side gears, etc., to achieve the aforementioned energy transfer functionality. To elaborate, the differential 110 may be an electronic locking differential, in one example. In another example, the differential 110 may be an electronic limited slip differential or a torque vectoring dual clutch. In yet other examples, an open differential may be used. Referring to the locking differential example, when unlocked, the locking differential may allow the two drive wheels to spin at different speeds and conversely, when locked, the locking differential may force the drive wheels to rotate at the same speed. In this way, the gear train configuration can be adapted to increase traction, under certain driving conditions. In the case of the limited slip differential, the differential allows the deviation of the speed between shafts 144 coupled to the drive wheels 128 to be constrained. Consequently, traction under certain road conditions (e.g., low traction conditions such as icy conditions, wet conditions, muddy conditions, etc.) may be increased due to the wheel speed deviation constraint. Additionally, in the torque vectoring dual clutch example, the differential may allow for torque delivered to the drive wheels to be independently and more granularly adjusted to again increase traction during certain driving conditions. The torque vectoring dual clutch may therefore provide greater wheel speed/torque control but may, in some cases, be more complex than the locking or limited slip differentials.

The vehicle 100 may also include a control system 150 with a controller 152. The controller 152 includes a processor 154 and memory 156. The memory 156 may hold instructions stored therein that when executed by the processor cause the controller 152 to perform the various methods, control techniques, etc., described herein. The processor 154 may include a microprocessor unit and/or other types of circuits. The memory 156 may include known data storage mediums such as random access memory, read only memory, keep alive memory, combinations thereof, etc. Furthermore, it will also be understood that the memory 156 may include non-transitory memory.

The controller 152 may receive various signals from sensors 158 coupled various locations in the vehicle 100 and the electric drive axle system 102. The sensors may include a motor-generator speed sensor 160, an energy storage device temperature sensor 162, an energy storage device state of charge sensor 164, wheel speed sensors 166, clutch position sensors 168, etc. The controller 152 may also send control signals to various actuators 170 coupled at different locations in the vehicle 100 and the electric drive axle system 102. For instance, the controller 152 may send signals to the electric motor-generator 106 and the energy storage device 108 to adjust the rotational speed and/or direction (e.g., forward drive rotational direction and reverse drive rotational direction) of the motor-generator. The controller 152 may also send signals to the first clutch assembly 132 and the second clutch assembly 134 to adjust the operational gear ratio in the gear train 104. For instance, the first clutch assembly 132 may be disengaged and the second clutch assembly 134 may be engaged to place the second gear set 129 in an operational state (transferring rotational energy between the electric motor-generator 106 and the output shaft 136). The other controllable components in the vehicle and gear system may function in a similar manner with regard to command signals and actuator adjustment. For instance, the differential 110 may receive command signals from the controller 152.

The vehicle 100 may also include an input device 172 (e.g., a gear selector such as a gear stick, gear lever, etc., console instrument panel, touch interface, touch panel, keyboard, combinations thereof, etc.) The input device 172, responsive to driver input, may generate a mode request indicating a desired operating mode for the gear train. For instance, in a use-case example, the driver may shift a gear selector into a gear mode (e.g., first gear mode or second gear mode) to generate a gear set modal transition request at the controller. In response, the controller commands gear train components (e.g., the first clutch assembly 132 and the second clutch assembly 134) to initiate a transition into a first gear mode, where the first gear set 127 is operational, from a second gear mode, where the second gear set 129 is operational, or vice versa. Other modality transitions have also been contemplated such as a modal transition into a forward drive mode from a reverse drive mode or vice versa responsive to driver input received from the input device 172. However, in other examples more automated gear train mode transitions may be implemented. For instance, the controller may automatically place the gear train in the first gear mode or the second gear mode based on vehicle speed and/or load, for example. The controller 152 may also be configured to transition the electric drive axle system 102 into a regenerative mode. In the regenerative mode, energy is extracted from the gear train using the electric motor-generator 106 and transferred to the energy storage device 108. For instance, the electric motor-generator 106 may be placed in a generator mode where at least a portion of the rotational energy transferred from the drive wheels to the generator by way of the gear train is converted into electrical energy. A variety of different modal control strategies have been contemplated. The power paths unfolding during the different system modes are discussed in greater detail herein with regard to FIGS. 18-20.

Figure 2:
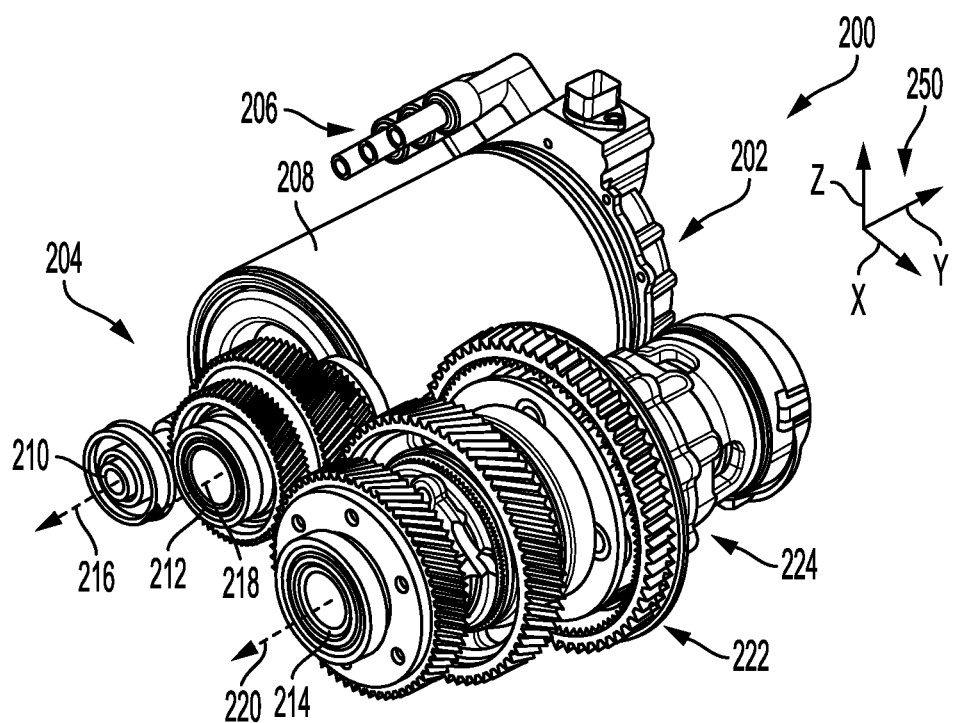
FIG. 2 shows a perspective view of an example of an electric drive axle system with a gear train having multiple selectable gear sets.

FIG. 2 shows an electric drive axle system 200. It will be appreciated that the electric drive axle system 200, shown in FIG. 2, serves as an example of the electric drive axle system 102 shown in FIG. 1. As such, at least a portion of the functional and structural features of the electric drive axle system 102 shown in FIG. 1 may be embodied in the electric drive axle system 200 shown in FIG. 2 or vice versa, in certain embodiments.

The electric drive axle system 200 again includes an electric motor-generator 202 and a gear train 204. The electric motor-generator 202 has an electrical interface 206 which is illustrated as a bus bar in FIG. 2. However, other suitable electrical interfaces may be used, in other examples. The electric motor-generator 202 further includes a housing 208. The gear train 204 may include an input shaft 210, an intermediate shaft 212, and an output shaft 214. The input shaft 210 receives rotational input (forward or reverse drive rotation) from the electric motor-generator 202, while the system is operating in forward and reverse drive modes. Different gears in a gear train 204 are coupled to the different shafts, expanded upon in greater detail herein with regard to FIG. 3. Rotational axes 216, 218, and 220 of the input shaft 210, the intermediate shaft 212, and the output shaft 214 are provided for reference in FIG. 2 and FIGS. 3-21 when applicable. FIG. 2 additionally shows a planetary gear assembly 222 rotationally coupled a differential 224 in the gear train 204. The power paths through the gear train 204 are discussed in greater detail herein. It will be appreciated that placing the planetary gear assembly 222 next to the differential 224 allows less torque to be carried through the gear train 204, enabling the drive train to have fewer and/or smaller components, if wanted.

The planetary gear assembly 222 can achieve a targeted gear ratio (e.g., a relatively high gear ratio, such as a ratio greater than 20:1) in a compact arrangement relative to non-planetary gear arrangements. Thus, the planetary gear assembly can achieve a desired gear ratio with less components (e.g., gears and shafts) than non-planetary gear assemblies, if desired. Furthermore, in embodiments where the planetary gear assembly exhibits a relatively high torque output, the planetary assembly can attain a more compact packaging due to the load sharing between the planet gears, if desired. Axis system 250 is illustrated in FIG. 2 as well as FIGS. 3-21, when appropriate, for reference. The z-axis may be a vertical axis, the x-axis may be a lateral axis, and/or the y-axis may be a longitudinal axis, in one example. However, the axes may have other orientations, in other examples.

Figure 3:
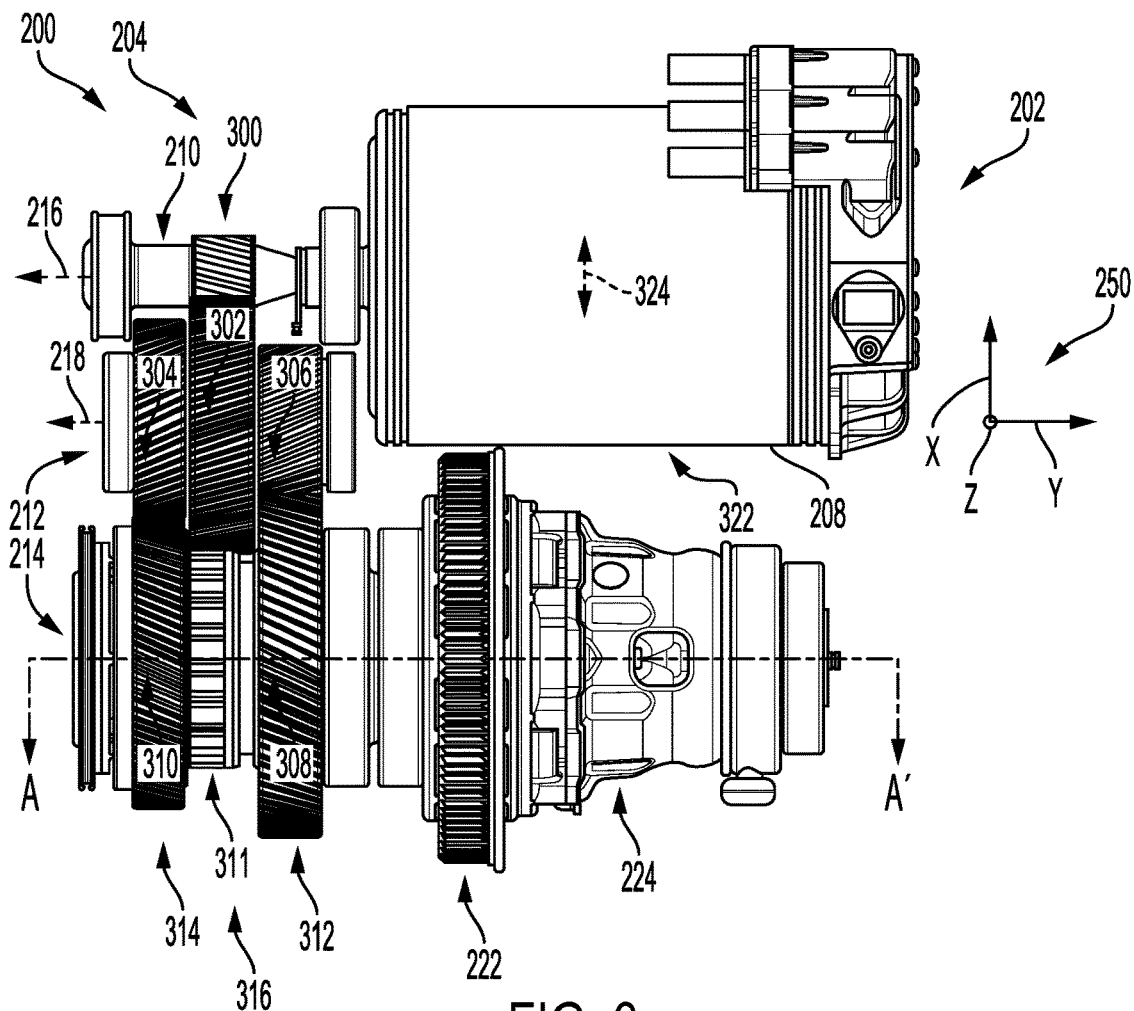
FIG. 3 shows a top view of the electric drive axle system, depicted in FIG. 2.

FIG. 3 shows the electric drive axle system 200 with the electric motor-generator 202, input shaft 210, intermediate shaft 212, output shaft 214, and gear train 204. The gear train 204 may include a first gear 300 coupled to the input shaft 210. As described herein, the descriptor "coupled to" may indicate one component is structurally coupled to or formed with another component. For instance, the first gear 300 may be machined from a flange on the input shaft 210, in one example, or separately manufactured and subsequently mechanically attached (e.g., welded, bolted, press-fit, etc.) to the input shaft 210.

A second gear 302 is coupled to the intermediate shaft 212. A third gear 304 and a fourth gear 306 are also coupled to the intermediate shaft 212. Additionally, a fifth gear 308 and a sixth gear 310 are coupled to the output shaft 214. It will be understood, that during different modes of system operation different sets of gears may be operational. To elaborate, the first gear 300, the second gear 302, the fourth gear 306, and the fifth gear 308 may be included in a first gear set 312. On the other hand, the first gear 300, the second gear 302, the third gear 304, and the sixth gear 310 may be included in a second gear set 314. A park gear 311 may also be included in the gear train 204, in some examples. However, the gear sets may include different gear combinations, in other examples. It will be understood that the first and the second gear sets 312 and 314 have different gear ratios. In this way, the gear train may include multiple gear ratios to increase gear train adaptability. Additionally, the gear sets may share a few common gears (i.e., the first and second gears in the illustrated embodiment). Fixing the first ratio (i.e., the first and second gears) in the gear train can allow the accuracy of the gears to be increased, if wanted, thereby reducing noise, vibration, and harshness (NVH) in the axle system. However, embodiments where the gear sets do not include overlapping gears have been envisioned. Clutches, described in greater detail herein, are included in the gear train 204 to enable the first gear set 312 and the second gear set 314 to be coupled/decoupled to/from the output shaft 214. In this way, the different gear sets may be operationally selected to, for example, more aptly suite the driving environment and/or increase electric motor efficiency. Thus, the first and second gear sets 312 and 314 may be conceptually included in a selectable gear assembly 316. A cutting plane A-A' indicating the cross-sectional view of FIG. 8 is provided in FIG. 3.

The planetary gear assembly 222 is shown in FIG. 3 rotationally coupled to the output shaft 214. FIG. 3 additionally illustrates the differential 224 in the gear train 204 rotationally coupled to the planetary gear assembly 222. However, gear trains with gears positioned between the planetary assembly and the differential, etc. It will be appreciated that in some embodiments, the gear ratio corresponding to the planetary gear assembly 222 may be greater than the gear ratio corresponding to the first gear set 312 or the second gear set 314. The planetary gear assembly 222 allows a desired gear ratio to be realized in a compact arrangement. For instance, the planetary gear assembly 222 may achieve a relatively high gear ratio and space efficiency, if desired. However, non-planetary gear arrangements may be used, in other examples. Furthermore, the planetary gear assembly 222 and the differential 224 are shown positioned on a lateral side 322 of a housing 208 the electric motor-generator 202. A lateral axis 324 of the motor-generator is provided for reference. Offsetting the output shaft 214 and the intermediate shaft 212 from the input shaft 210 allows the planetary gear assembly 222 to be positioned on the side 322 of the motor-generator. It will be appreciated that the planetary gear assembly may be located adjacent to the motor's lateral side 322 due to the planetary gear assembly's ability to be integrated into the gear train without a mating gear parallel thereto, if wanted. In this way, the planetary gear assembly may be placed in a spaced which has remained unused in certain electrified gearboxes. Thus, positioning the planetary gear assembly on the side of the motor allows the compactness of the axle system to be increased. As a result, the packaging constraints arising during axle installation in the vehicle may pose less of an issue. However, in other examples, the planetary gear assembly 222 may be positioned in other suitable locations. For instance, the planetary gear assembly may be coupled to a section of the output shaft extending away from the motor-generator.

Figure 4:
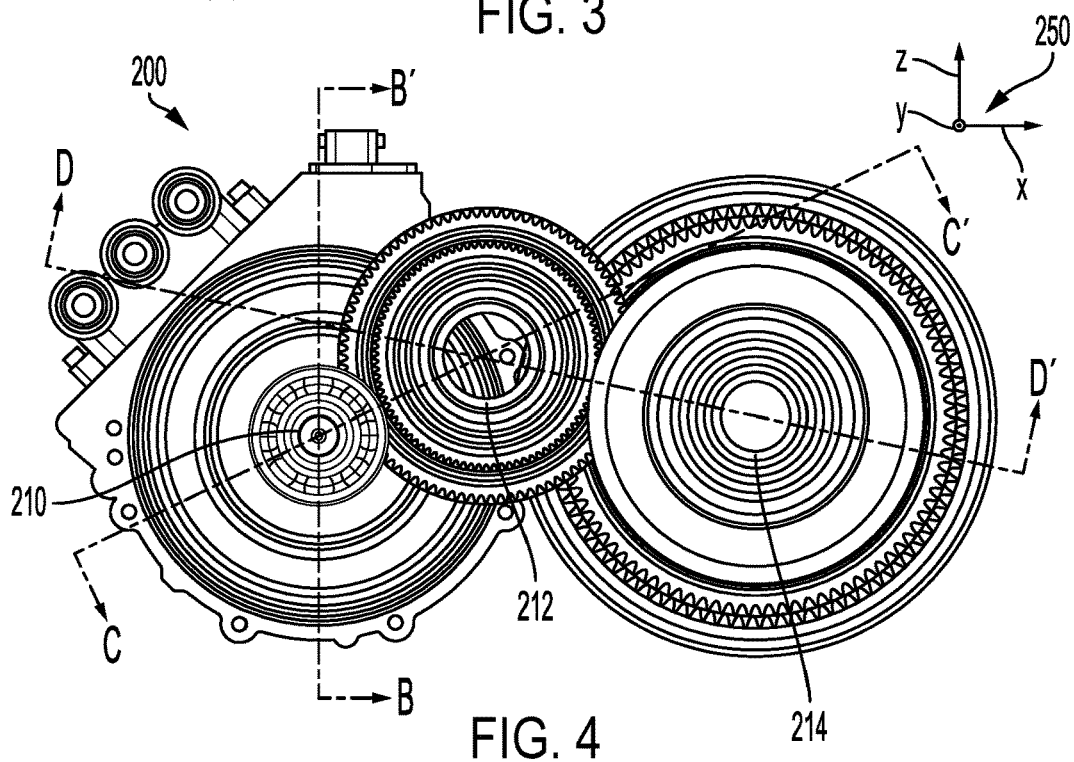
FIG. 4 shows a side view of the electric drive axle system, depicted in FIG. 2.

FIG. 4 shows a side view of the electric drive axle system 200 with the input shaft 210, intermediate shaft 212, and the output shaft 214. A cutting plane B-B' indicating the cross-sectional view of FIG. 5, a cutting plane C-C' indicating the cross-sectional view of FIG. 6, and a cutting plane D-D' indicating the cross-sectional view of FIG. 7 are illustrated in FIG. 4.

FIG. 5 shows a cross-section view of the electric motor-generator 202 and input shaft 210 in the electric drive axle system 200. The input shaft 210 is shown transition fit with a rotor shaft 500. However, other suitable coupling techniques have been contemplated, such as press fitting, welding, splined engagement, etc. The rotor shaft 500 is coupled to a rotor 501 designed to electromagnetically interact with a stator 503 to generate forward drive rotational output, reverse drive rotational output, and/or generate electrical energy during a regeneration mode.

A first bearing 502 and a second bearing 504 are shown coupled to the input shaft 210 with the first gear 300 thereon. The bearings 502 and 504 are positioned on opposing axial sides of the first gear 300, to for example reduce shaft bending moments. However, other bearing arrangements have been envisioned such as a bearing arrangement with one or two bearings on an outboard side of the first gear 300. As described herein, a bearing is a component designed to enable rotation of the component(s) to which it is attached and therefore may include rolling elements (balls, cylindrical rollers, tapered cylindrical rollers, etc.), races (e.g., inner and outer races), etc., to enable the rotational functionality to be achieved. In one specific example, the first bearing 502 may be a floating bearing and/or may be coupled to the input shaft 210 via a slip fit spline 506. In another specific example, the second bearing 504 may be a fixed bearing. However, other suitable bearing configurations may be used, in other examples, such as an arrangement where both of the bearings are fixed bearings, for instance.

Turning to FIG. 6, where the input shaft 210 and the first gear 300 are shown rotationally attached to the second gear 302 in the intermediate shaft 212 of the gear train 204 of the electric drive axle system 200. Therefore, during gear train operation, rotational motion is imparted between the first gear 300 and the second gear 302. The third gear 304 and the fourth gear 306 attached to the intermediate shaft 212 are also depicted in FIG. 6. However, other gearings arrangements may be used, in other examples. Bearings 600 are shown positioned on opposing axial sides 602 of the intermediate shaft 212. The bearings 600 are specifically illustrated as tapered roller bearings. However, other types of bearings and/or bearing arrangements may be used for the intermediate shaft, in other examples.

FIG. 7 shows a detailed cross-sectional view of the intermediate shaft 212 and the output shaft 214 included in the electric drive axle system 200. The sixth gear 310 is shown coupled to the output shaft 214. The fifth gear 308 is arranged on a bearing 700 on the output shaft 214. The planetary gear assembly 222 and the differential 224 are also shown in FIG. 7. The differential 224 is depicted as a bevel gear differential, in FIG. 7, discussed in greater detail herein. However, planetary gear, spur, or helical gear differentials may be used, in other embodiments.

Referring to FIG. 8 showing a more detailed view of the output shaft 214 and corresponding components in the gear train 204 of the electric drive axle system 200. Specifically, the fifth gear 308, the sixth gear 310, the planetary gear assembly 222, and the differential 224 are again depicted. The electric drive axle system 200 includes clutches allowing the gear ratio in the gear train 204 delivered to the planetary gear assembly 222 to be adjusted, based on system operating conditions. Specifically, a first clutch assembly 800 is configured to rotationally couple and decouple the fifth gear 308 to/from the output shaft 214 and a second clutch assembly 802 is configured to rotationally couple and decouple the sixth gear 310 to/from the output shaft.

FIG. 9 shows a detailed view of the first clutch assembly 800 configured to rotationally couple/decouple the fifth gear 308 to/from the output shaft 214. To elaborate, the first clutch assembly 800 includes a locking clutch 900 and a one-way clutch 902, in the illustrated example. The one-way clutch 902 is designed to freely rotate about the output shaft 214 when receiving rotational input in a first direction (reverse drive rotational direction) from the fifth gear 308 or when it is overrun via the output shaft. The one-way clutch 902 is also configured to transfer torque to the output shaft 214 when receiving rotational input in a second direction (e.g., front drive rotational direction) from the fifth gear 308. The one-way clutch 902 may be a sprag clutch, in one example. However, other suitable types of one-way clutches may be used in other examples, such as ratcheting clutches. Additionally, a section 903 of the output shaft 214 below the one-way clutch 902 may be locally thicker due to the contact stress and deflection of shaft along the one-way clutch, in one example. Further, in some examples, snap rings 905 may be used to axially retain the one-way clutch 902 and/or the bearing 700.

An embodiment of a one-way clutch is shown in FIG. 21. The sprag clutch 2100 includes a plurality of sprag mechanisms 2102 mounted on carrier rings 2104. The sprag mechanisms 2102 may be spring loaded and rotate about axis 2106. The sprag mechanisms 2102 include curved surfaces 2108 having asymmetric profiles. When the fifth gear (e.g., fifth gear 308, shown in FIG. 9) attached to the sprag clutch rotates in the forward drive direction, at a speed greater than the output shaft (e.g., output shaft 214 shown in FIG. 9), the curved surfaces 2108 frictionally engage an outer surface of the output shaft and an inner surface of the fifth gear to allow the fifth gear and the output shaft to rotate in unison. Contrariwise, when the fifth gear is rotated in the reverse drive direction or the output shaft speed exceeds the gear speed, the curved surfaces 2108 in the sprag mechanisms 2102 disengage and allow the fifth gear 308, shown in FIG. 9, to freewheel with regard to the output shaft 214, referred to herein as a freewheel configuration. The sprag clutch allows for quick and robust engagement between the clutch and the shaft when transitioning from the freewheel configuration to the engaged configuration. The sprag clutch may also have less drag in the freewheel configuration when compared to other types of one-way clutches, such as one-way clutches including ratcheting mechanisms.

The locking clutch 900, illustrated in FIG. 9, is designed to rotationally couple and decouple the fifth gear 308 from the output shaft 214. To elaborate, the locking clutch 900 may be a dog clutch with teeth 904 on an axially adjustable shift collar 906 designed to mate with teeth 908 in the fifth gear 308 when engaged. Conversely, when the dog clutch is disengaged the teeth 904 on the shift collar 906 may be spaced away from the teeth 908 on the fifth gear 308. The bearing 700 (e.g., needle roller bearing) coupled to the fifth gear 308 is also shown in FIG. 9. It will be appreciated that the bearing 700 may pilot the one-way clutch 902. The shift collar 906 may be rotationally attached to the output shaft 214 by way of an indexing shaft 910. Furthermore, the indexing shaft 910 may be attached to the output shaft via press-fitting, a splined interface, combinations thereof, etc. However, the first clutch assembly 800 may take other forms, in alternate embodiments. For instance, the first clutch assembly may be a friction clutch, in an alternate example.

A thrust bearing 912 (e.g., needle roller thrust bearing) is also shown positioned at an interface between the indexing shaft 910 and the fifth gear 308 to enable a desired spacing to be maintained between the components while allowing rotation therebetween. Additionally, the thrust bearing 912 may be preloaded via a spring 914 (e.g., a wave spring, helical spring, elastomeric spring, etc.). However, other suitable gear train arrangements may be used in other examples such as gear trains where the spring 914 and/or thrust bearing 912 are omitted. A bearing 916 (e.g., a fixed bearing) is also shown attached to an extension 918 (e.g., axial extension) of the fifth gear 308 interfacing with the one-way clutch 902. However, in other examples the bearing 916 may be omitted from the gear train. The bearing 916 is specifically depicted as a ball bearing. The ball bearing may be used in the system, due to cost and packaging. However, the bearing 916 may be a spherical roller bearing, a tapered roller bearing, four point contact bearing, etc., in other embodiments. In one example, the bearing 916 may be fixed on both sides to allow the spring 914 to apply a preload to the thrust bearing 912 and the sixth gear 310. The one-way clutch 902 is also shown positioned between the extension 918 of the fifth gear 308 and an outer surface 919 of the output shaft 214. However, alternate locations of the one-way clutch have been contemplated.

The second clutch assembly 802 is depicted in FIG. 9 as a wet friction clutch. Using a wet friction clutch enables load transfer in both forward and reverse directions, allowing the drive train to forego a locking clutch in the second clutch assembly, in some instances. However, alternate types of clutches such as hydraulic clutches, electromagnetic clutches, and the like may be deployed, in other arrangements. The wet friction clutch includes friction plates 920 engaging one another when the clutch is activated to transfer rotational energy from the sixth gear 310 to the output shaft 214. Likewise, when the wet friction clutch is disengaged, the friction plates 920 are frictionally decoupled and rotational energy transfer from the sixth gear 310 to the output shaft 214 is inhibited. To elaborate, a first set of friction plates 921 are coupled to the sixth gear 310 and a second set of friction plates 923 are coupled to the output shaft 214 to enable coupling/decoupling action in the clutch.

Various bearings may enable the wet friction clutch to be rotated as well as provide axial and radial support to the clutch. The bearing corresponding to the wet friction clutch may include for example, a pilot bearing 922 (e.g., floating pilot bearing), a roller bearing 924 (e.g., needle roller bearing, a thrust bearing 926 (e.g., needle roller thrust bearing), and a roller bearing 928. However, other suitable bearing arrangements providing a desired amount of radial and axial support to the wet friction clutch and output shaft for the wet friction clutch have been contemplated.

The wet second clutch assembly 802 (e.g., friction clutch) and the locking clutch 900 may be adjusted via commands from a controller, such as the controller 152 shown in FIG. 1, to induce engagement or disengagement of each clutch.

As such, the gear train's gear ratio may be adjusted as desired based on vehicle operating conditions, driver input, etc.

Referring again to FIG. 8, showing the planetary gear assembly 222 rotationally coupled to the output shaft 214. FIG. 8 also illustrates the planetary gear assembly 222 with a sun gear 810 rotationally coupled to output shaft 214. The sun gear 810 is rotationally coupled to planet gears 812 residing on planet pins 814 on a carrier 816. In turn, the carrier 816 is shown coupled to the differential 224. However, planetary arrangements with other components (e.g., carrier or annulus) coupled to the output shaft 214 and other components (e.g., sun gear or annulus) coupled to the differential 224, have been envisioned. The planetary gear assembly 222 also includes an annulus 818 rotationally interacting with the planet gears 812. Bearings 820 (e.g., needle roller bearings) arranged between the planet pins 814 and the planet gears 812 may allow the planet gear to rotate. A thrust bearing 822 (e.g., needle roller thrust bearing) may also be coupled to the sun gear 810 to enable rotation thereof and provide axial support thereto.

The annulus 818 may be held fixed to enable the planetary gear assembly 222 to achieve a relatively high gear ratio. Thus, the annulus 818 may include suitable features such as a spline 828 to enable the position of the annulus to be fixed. However, planetary gear arrangements where alternate components are held fixed and alternate components are allowed to rotate may be utilized, in other examples. For instance, the annulus may be allowed to freely rotate and the carrier may be held stationary, in one example, or the sun gear may be held stationary and the carrier and the annulus may be allowed to rotate, in other examples. In one embodiment, the components in the planetary gear assembly that are allowed to rotate and held stationary may not be adjustable. To elaborate, the components in the planetary gear assembly that are allowed to rotate and held substantially stationary may remain in the same state (a substantially fixed state or a rotational state) during gear train operation, in some embodiments. The planetary gear assembly can therefore achieve even greater space efficiency, in such an embodiment. In other embodiments, planetary components whose fixed/rotational state can be adjusted during gear train operation have also been contemplated. Thrust washers and/or bushings 830 may also be positioned on opposing axial sides of the planet gears 812 to provide planet gear spacing and support functionality.

A clutch assembly 832 configured to lock and unlock the differential 224 may also be included in the gear train 204. The clutch assembly 832 may, in one example, include a dog clutch 834 configured to operate in a locked and unlocked configuration. In the locked configuration the dog clutch 834 causes the side gears 836 to rotate in unison. Conversely, in the unlocked configuration, the dog clutch 834 allows the side gears 836 to have rotational speed variance. One of the gears 836 may therefore include teeth 837 mating/disengaging with/from teeth 839 in the dog clutch 834. The clutch assembly 832 may further include an electronic actuator 835 (e.g., solenoid) inducing engagement and disengagement of the clutch assembly 832. However, pneumatic or hydraulic clutch actuation may be utilized, in other embodiments.

FIG. 8 also shows the differential 224 rotationally coupled to an axle 838. Specifically, the side gears 836 may be rotationally attached to axle 838. The axle 838 is shown including a first shaft section 840 which may be coupled to a first drive wheel and a second shaft section 842 which may be coupled to a second drive wheel. However, in other examples, a continuous shaft may extend through the differential or the shaft may be partitioned into additional sections. The axle 838 may be a beam axle, enabling the load carrying capacity and the durability of the axle to be increased, if wanted. However, non-rigid axle designs may be utilized, in other cases. Additionally, the axle 838 is positioned within an interior opening 841 of the output shaft 214 and is positioned co-axial therewith, to increase system compactness. However, off-axis axle-output shaft layouts may be used, in some instances. A bearing 846 is also shown coupled to a case 848 of the differential 224. Additionally, a bearing 849 is shown coupled to the planetary gear assembly 222 (e.g., the carrier 816). However, the bearing 849 may be omitted or placed in another suitable location, in other embodiments.

The case 848 is rotationally coupled to the carrier 816. In turn, the case 848 is rotationally coupled to internal differential gearings. FIG. 8 specifically shows the differential 224 embodied as a locking type differential (e.g., electronic locking differential). However, as previously discussed, alternate types of differentials have been contemplated such limited slip differentials (e.g., electronic limited slip differentials), differentials with a torque vectoring dual clutch, open differentials, etc. In the case of an open differential, the differential may share a common case with the planetary gear assembly and the case may be sized and profiled to enable differential gear installation. Furthermore, the differential 224 depicted in FIG. 8 includes bevel gears 860 attached via a bevel gear shaft 862. Additionally, in the illustrated embodiment, the bevel gears 860 are rotationally coupled to the side gears 836. However, planetary, spur, and helical gear type differentials may be used, in other examples.

FIG. 10 shows a detailed view of the second clutch assembly 802 (e.g., wet friction clutch) in the gear train 204 and a lubrication system 1000. The second clutch assembly 802 includes a friction clutch 1002, in the embodiment illustrated in FIG. 10. However, as previously discussed alternate types of clutch assemblies have been contemplated.

The friction clutch 1002 includes a friction disk carrier 1004, the plurality of friction plates 920, a clutch drum 1006, the roller bearing 928 (e.g., thrust roller bearing), and the pilot bearing 922 (e.g., ball bearing). A wave spring 1008 and a snap ring 1010 are also shown coupled to an axial side of the pilot bearing 922 to axially preload the bearing. However, other clutch arrangements have been contemplated, such as clutch embodiments with a different quantity and/or types of bearings, different mounting structures, different preload structures, etc. The friction disk carrier 1004 is fixedly coupled to the output shaft 214. For instance, an inner surface 1012 of the friction disk carrier 1004 may be press-fit onto an outer surface 1014 of the output shaft 214.

The roller bearing 924 (e.g., needle roller bearing) is also shown positioned between the clutch drum 1006 and the output shaft 214. Additionally, the thrust bearing 926 (e.g., needle roller thrust bearing) is shown coupled to the clutch drum 1006. The thrust bearing 926 allows the clutch drum 1006 and the output shaft 214 to independently rotate when the friction clutch 1002 is disengaged. However, as previously discussed, different bearing arrangements providing a desired degree of radial and/or axial support determined based on design parameters such as shaft and gearing sizing, shaft and gearing material construction, expected gear train operating speed range, and the like, have been envisioned. The park gear 311 attached to indexing shaft 910 mounted on the output shaft 214 is also shown in FIG. 10.

The sixth gear 310 is shown fixedly coupled to the clutch drum 1006. To elaborate, the sixth gear 310 includes an inner surface 1016 coupled to an outer surface 1018 of the clutch drum 1006 radially outward from the plurality of friction plates 920.

The friction plates 920 include the first set of friction plates 921 coupled to the clutch drum 1006. Conversely, the second set of friction plates 923 are coupled to the friction disk carrier 1004. The different sets of friction plates may frictionally engage and disengage to bring about clutch engagement and disengagement. When the friction clutch 1002 is engaged, the sixth gear 310 and the output shaft 214 co-rotate. However, when the friction clutch 1002 is disengaged the sixth gear 310 and the output shaft 214 are allowed to independently rotate with regard to one another. The friction clutch 1002 may additionally include a support plate 1020 which may be press-fit or otherwise coupled to the clutch drum 1006. A snap ring 1022 may also be provided to retain the support plate 1020 in a desired position. However, other clutch arrangements with differently profiled support plates, clutch drums, etc., may be used in other examples.

To induce clutch engagement/disengagement action, an actuator 1024 (e.g., electromagnetic, hydraulic, or pneumatic actuator), schematically illustrated in FIG. 10, may be included in the friction clutch. To elaborate, the actuator 1024 may be designed to axially extend and retract a piston 1026 through an opening 1027 (e.g., through holes) in the clutch drum 1006. Although one piston and through hole are shown in FIG. 10, it will be appreciated that the actuator may include multiple pistons and through holes, a piston with multiple heads and through holes, etc. Thus, the piston 1026 interacts with a pressure plate 1028 to induced frictional engagement/disengagement of the friction plates 920. Axial movement of the piston in direction 1030 therefore precipitates clutch engagement and axial movement of the piston in direction 1032 precipitates clutch disengagement. However, in other embodiments, the piston and pressure plate may be positioned on the opposing side of the clutch.

The lubrication system 1000 is configured to supply a lubricant (e.g., synthetic oil, non-synthetic oil, combinations thereof, etc.) to the friction clutch 1002 and other gear train components, in some cases. The lubrication system 1000 may include a reservoir 1034 and a pump 1036 configured to generate lubricant flow in the system. Although the pump 1036 and reservoir 1034 are schematically illustrated away spaced away from each other, embodiments where the pump is integrated into the reservoir, have been contemplated. The pump 1036 may include conventional components such as pistons, chambers, valves, seals, rotors, etc., to generate lubricant pressurization. It will also be understood, that the reservoir 1034 may be constructed as a sump to receive lubricant from components in the gear train. The pump 1036 may be controlled via a suitable controller, such as controller 152, shown in FIG. 1. The lubrication system 1000 may additionally include seals, valves (e.g., check valve, active valves, etc.), etc., in some cases.

The pump 1036 is in fluidic communication with a lubrication channel 1038 positioned between an outer surface 1040 of first shaft section 840 in the axle 838 and an inner surface 1042 of the output shaft 214. Thus, in one example, the lubrication channel 1038 may circumferentially surround the first shaft section 840. However, in other examples, the lubrication channel 1038 may be bounded in specific radial sections around the first shaft section 840.

The lubrication channel 1038 include an outlet 1044 radially extending through the output shaft 214. Although a single outlet is illustrated, it will be understood that in certain embodiments, the lubrication channel may include a plurality of radial outlets opening into the friction clutch. In such an embodiment, the outlets may be evenly spaced around the output shaft, to avoid rotational imbalance, in some instances.

The outlet 1044 is also shown radially extending through the friction disk carrier 1004. In this way, lubricant may be efficiently routed to the friction plates 920. Specifically, the outlet 1044 is shown opening into a section of the clutch below a portion of the friction plates coupled to the friction disk carrier 1004. Lubricant may flow radially through the friction plates 920 once introduced into the friction clutch. The sixth gear 310 is shown including a tapered section 1046, tapering in axial direction 1048, in the illustrated example. However, in other examples, the tapered section may be on the other axial side of the sixth gear 310. The clutch drum 1006 includes an opening 1050 (e.g., radially aligned opening) positioned radially inward from the tapered section 1046. In this way, outflow from the clutch's friction plates 920 can be expelled from the friction clutch. Put another way, the sixth gear is back-drafted to enable lubricant outflow from the friction clutch.

The clutch drum 1006 also includes the outer surface 1018 (e.g., pilot surface) in face sharing contact with the inner surface 1016 of the sixth gear 310. Specifically, the sixth gear 310 may be press-fit and welded to the outer surface 1018, in one example. However, in other examples, the sixth gear 310 may attached to the clutch drum via a splined interface, heavy pressed interface, welding, bolting, via a snap ring, combinations thereof, etc.

Arrows 1052 indicate the general direction of lubricant flow through the lubrication system 1000. Thus, as illustrated, lubricant travels through the lubrication channel 1038 to the outlet 1044 extending through the output shaft 214 and the friction disk carrier 1004 into the friction plates 920. From the friction plates 920, lubricant is directed through the opening 1050 in the clutch drum 1006 and through a channel below the tapered section 1046 of the sixth gear 310 and out of the friction clutch. However, other suitable paths for lubricant routing have been envisioned, such as a path where lubricant is expelled on the other axial side of the clutch assembly.

FIG. 11 shows a detailed view of the output shaft 214 with openings 1100 forming a portion of the outlet(s) 1038 of the lubrication channel 1038, shown in FIG. 10. As previously discussed, although one outlet 1044 is shown in FIG. 10, the lubrication system may include a plurality of outlets opening into the friction clutch. Continuing with FIG. 11, splines 1102 designed to mate with splines 1202 in the friction disk carrier 1004, shown in FIG. 12, are also depicted in FIG. 11. However, in other examples, the friction disk carrier may be press-fit onto the output shaft. Additionally, splines 1104 designed to mate with splines in the indexing shaft 910, shown in FIG. 10, are also depicted in FIG. 11. However, the indexing shaft 910 may form an interference fit with the output shaft, in other examples. Additionally, FIG. 11 illustrates the surface 1106 on the output shaft 214 coupled to the pilot bearing 922, depicted in FIG. 10.

FIG. 12 shows a detailed view of the friction disk carrier 1004. The friction disk carrier 1004 includes openings 1200 forming a portion of the outlets of the lubrication channel 1038, shown in FIG. 10. It will be appreciated that when assembly, the openings 1200 in the friction disk carrier 1004 may be radially aligned with the openings 1100 in the output shaft 214, shown in FIG. 11. The friction disk carrier 1004 may include interior splines 1202 configured to mate with the splines 1102 in the output shaft 214, shown in FIG. 11 and exterior splines 1204 configured to mate with splines in a portion of the friction plates 920, shown in FIG. 10.

FIG. 13 shows a detailed view of the clutch drum 1006. The clutch drum 1006 includes openings 1300 radially extending therethrough and allowing lubricant outflow from the clutch. The clutch drum 1006 may also include splines 1302 configured to mate with a portion of the friction plates 920, shown in FIG. 10. An outer surface 1304 designed to attach (e.g., press-fit, weld, etc.) to the sixth gear 310, shown in FIG. 10, is additionally depicted in FIG. 13. The openings 1027 (e.g., through holes) in the clutch drum 1006 is also shown in FIG. 13.

FIG. 14 shows a detailed view of the first clutch assembly 800. The one-way clutch 902, locking clutch 900 with the shift collar 906, bearing 916, thrust bearing 912, park gear 311, indexing shaft 910, fifth gear 308, and bearing 700 are again illustrated. Another outlet 1400 of the lubrication channel 1038 of the lubrication system 1000 arranged between the output shaft 214 and the first axle shaft section 840 is also depicted. Arrow 1402 indicates the general direction of lubricant flow through the outlet 1400. The outlet 1400 radially extends through the output shaft 214 into a section of the first clutch assembly 800 axially between the one-way clutch 902 and the bearing 700. In this way, the lubrication system may provide lubricant to other components in the drive axle. As a result, the lubrication system's capabilities are expanded to reduce wear in other drive train components. However, in other examples, the outlet 1400 may be omitted from the lubrication system 1000.

FIGS. 15-16 depict different views of the fifth gear 308 including teeth 1500, an inner surface 1502 that may be adjacent to sprags in the one-way clutch 902, shown in FIG. 14, and an axial extension 1504 that may be coupled to the bearing 916, shown in FIG. 14. The fifth gear 308 is also shown with dog clutch teeth 904 designed to mate with corresponding teeth 908 in the shift collar 906, shown in FIGS. 9 and 14. The teeth 904 are shown in a "face" style arrangement designed for axially engagement/disengagement. However, dog teeth having a "sleeve" type arrangement designed for radial engagement/disengagement, have been envisioned. As previously discussed, the shift collar is designed to axially translate along the indexing shaft to induce clutch locking/unlocking action. Thus, when the teeth are mated, the locking clutch 900, shown in FIG. 14, is engaged, and when the teeth are decoupled, the locking clutch is disengaged. The axial extension 1504 and dog clutch teeth 904 are positioned on opposing axial sides of the fifth gear 308, in the illustrated embodiment. However, in other examples, the axial extension and the teeth may be positioned on the same axial side of the fifth gear.

FIG. 17 shows a method for operation of a lubrication system in an electric drive axle. The method 1700 may be implemented via one or more of the lubrication systems and electric drive axles described above with regard to FIGS. 1-16, in one embodiment, or may be implemented by another suitable lubrication system and electric drive axle, in other embodiments. Furthermore, the method 1700 may be implemented via instructions stored in memory (e.g., non-transitory memory) executable by a processor.

At 1702, the method includes flowing lubricant through a lubrication channel between an outer surface of an axle shaft and an inner surface of an output shaft. Next at 1704, the method includes flowing lubricant from the lubrication channel to an interior of a first clutch (e.g., friction clutch) and at 1706, the method includes flowing lubricant out of the first clutch through a gear coupled to the first clutch. In this way, the first clutch's lubrication needs may be met, thereby increasing clutch longevity. It will also be appreciated that in some example, the friction clutch may be actuated while it is being lubricated. Thus, the method may include in one example, actuating a piston extending through a radially aligned hole in a clutch drum to engage or disengage a plurality of friction plates in the first clutch.

Next at 1708 the method may include flowing the lubricant from the lubrication channel to a second clutch (e.g., one-way clutch), allowing additional components in the drive axle to be lubricated via a common lubrication channel located between the axle shaft and the output shaft. Method 1700 enables lubricant to be efficiently routed to different drive axle clutches to achieve a targeted amount of component lubrication in the drive axle.

FIGS. 18-20 show the gear train 204 operating in different modes. As such, the gear train 204 may be placed in different operational modes via a controller, such as the controller 152, shown in FIG. 1. The modes may include a first gear mode where the first gear set 312, shown in FIG. 3, transfers rotational energy between the electric motor-generator 202 and the planetary gear assembly 222. The modes may also include a second gear mode where the second gear set 314, shown in FIG. 3, transfers rotational energy between the electric motor-generator 202 to the planetary gear assembly 222. The modalities may also be partitioned based on reverse and forward drive motor arrangement. To elaborate, the electric motor-generator 202 may produce rotational output in a first direction corresponding to forward drive and may produce rotational output in a second direction opposing the first corresponding to reverse drive. As such, the gear train modalities may include a forward drive first gear mode, a reverse drive first gear mode, a forward drive second gear mode, and/or a reverse drive second gear mode. It will also be understood that the gear train may be operated in a regenerative mode where torque input from the drive wheels, such as the drive wheels 128 shown in FIG. 1, is transferred to the electric motor-generator and the electric motor-generator converts at least a portion of the drive train's rotational energy into electrical energy. In turn, in the regenerative mode the electric energy may be transferred from the motor-generator to an energy storage device, such as the energy storage device 108 shown in FIG. 1.

Turning to FIG. 18, illustrating the gear train 204 of the electric drive axle system 200 arranged in the forward drive first gear mode where the electric motor-generator 202 produces forward drive rotational output, the second clutch assembly 802 is disengaged, and the first clutch assembly 800 is engaged (e.g., configured to transfer energy from the fifth gear 308 to the output shaft 214 via the one-way clutch 902). The power path in the forward drive first gear mode of the gear train 204 is indicate via arrows 1800. Thus, in the forward drive first gear mode, rotational energy is transferred from the electric motor-generator 202 to the first gear 300, from the first gear to the second gear 302, from the fourth gear 306 to the fifth gear 308, from the fifth gear through the first clutch assembly 800 (e.g., through the one-way clutch 902) to the output shaft 214, from the output shaft to the planetary gear assembly 222, from the planetary gear assembly to the differential 224, and from the differential to the axle 838.

FIG. 19 shows the gear train 204 of the electric drive axle system 200 arranged in the forward drive second gear mode where the electric motor-generator 202 produces forward drive rotational output, the second clutch assembly 802 is engaged, and the first clutch assembly 800 is disengaged (e.g., the locking clutch 900 is disengaged and the one-way clutch 902 is overrun). It will be understood, that the one-way clutch 902 is overrun due to the ratio of the mesh between the third gear 304 and sixth gear 310 being lower than the ratio of the mesh between the fourth gear 306 and the fifth gear 308, resulting in no load being transferred between the fourth and fifth gear. The power path in the forward drive second gear mode of the gear train 204 is indicate via arrows 1900. Thus, in the forward drive second gear mode, rotational energy is transferred from the electric motor-generator 202 to the first gear 300, from the first gear to the second gear 302, from the third gear 304 to the sixth gear 310, from the sixth gear through the second clutch assembly 802 to the output shaft 214, from the output shaft to the planetary gear assembly 222, from the planetary gear assembly to the differential 224, and from the differential to the axle 838.

FIG. 20 shows the gear train 204 of the electric drive axle system 200 arranged in the regenerative first gear mode where the electric motor-generator 202 generates electrical energy from drive wheel torque transferred to the motor-generator through the gear train 204. Additionally, in the regenerative first gear mode the second clutch assembly 802 is disengaged, and the first clutch assembly 800 is engaged (e.g., configured to transfer energy from the fifth gear 308 to the output shaft 214 via the locking clutch 900). The power path in the regenerative first gear mode of the gear train 204 is indicate via arrows 2000. As such, in the regenerative first gear mode, rotational energy is transferred from the differential 224 to the planetary gear assembly 222, from the planetary gear assembly to the output shaft 214, from the output shaft to the fifth gear 308 through the first clutch assembly 800 (e.g., through the locking clutch 900 bypassing the one-way clutch 902), from the fifth gear to the fourth gear 306, from the second gear 302 to the first gear 300 and then to the electric motor-generator 202.

It will be appreciated that during a reverse first gear mode, the power path through the gear train 204 may be similar to the power path shown in FIG. 20. For instance, the power path in the reverse first gear mode may travel through the similar components to the power path denoted via arrows 2000. However, in the reverse power path the arrows are reversed. Therefore, in the reverse first gear mode the second clutch assembly 802 may be disengaged, and the first clutch assembly 800 may be engaged (e.g., configured to transfer energy from the fifth gear 308 to the output shaft 214 via the locking clutch 900).

The electric drive axles and lubrication systems described herein have the technical effect of providing a lubrication system that space efficiently routes lubricant to desired component to reduce friction in the component while maintaining a desired amount of drive axle compactness, in some cases.

FIGS. 1-21 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, an electric drive axle system is provided that comprises a gear train configured to rotationally attach to an electric motor-generator, the gear train comprising: an output shaft having a first clutch arranged thereon and configured to selectively rotationally couple a first gear to the output shaft; where the first gear is configured to receive torque from the electric motor-generator; and where the output shaft is rotationally coupled to a gear assembly, the gear assembly is rotationally coupled to a differential, and the differential is rotationally coupled to an axle shaft arranged co-axial with the output shaft; and a lubrication channel extending between the output shaft and the axle shaft and including a first outlet extending through the output shaft and opening into the first clutch.

In another aspect, a method for operating a lubrication system in an electric drive axle is provided that comprises flowing a lubricant through a lubrication channel between an outer surface of an axle shaft and an inner surface of an output shaft; flowing the lubricant from the lubrication channel to an interior of a first clutch; and flowing the lubricant out of the first clutch through a gear coupled to the first clutch; where the output shaft is rotationally coupled to a planetary gear assembly; and where the planetary gear assembly is directly coupled to a differential.

In yet another aspect, an electric drive axle system is provided that comprises a gear train configured to rotationally attach to an electric motor-generator, the gear train comprising: an output shaft having a wet friction clutch arranged thereon and configured to selectively rotationally couple a gear to the output shaft; where the gear is configured to receive torque from the electric motor-generator; where the output shaft is rotationally coupled to a planetary gear assembly, the planetary gear assembly is directly rotationally coupled to a differential and the differential is coupled to a beam axle arranged co-axial with the output shaft; and a lubrication conduit extending between the output shaft and the axle and including a first outlet opening into a plurality friction plates in the wet friction clutch.

In any of the aspects or combinations of the aspects, where the lubrication channel may circumferentially surround an outer surface of the axle.

In any of the aspects or combinations of the aspects, the first gear may include a tapered inner surface configured to outflow the lubricant from the first clutch.

In any of the aspects or combinations of the aspects, the first gear may be coupled to a section of a clutch drum radially outward from a plurality of friction plates.

In any of the aspects or combinations of the aspects, the first outlet of the lubrication channel may extend radially through a friction disk carrier positioned radially inward from a plurality of friction plates in the first clutch.

In any of the aspects or combinations of the aspects, the lubrication channel may include a second outlet extending through the output shaft adjacent to a second clutch.

In any of the aspects or combinations of the aspects, the second clutch may be a one-way clutch.

In any of the aspects or combinations of the aspects, the second outlet extending through the output shaft adjacent to the second clutch may be adjacent to a roller bearing coupled to a second gear on the output shaft.

In any of the aspects or combinations of the aspects, the axle may be a beam axle and where the gear assembly is a planetary gear assembly.

In any of the aspects or combinations of the aspects, the planetary gear assembly may be directly coupled to the differential without any intervening components positioned therebetween.

In any of the aspects or combinations of the aspects, the first clutch may be a friction clutch, the gear may include a tapered inner surface, and the lubricant may outflow through a conduit formed between the tapered inner surface and a section of a clutch drum positioned radially outward from the plurality of friction plates in the friction clutch.

In any of the aspects or combinations of the aspects, the method may further comprise actuating a piston extending through a radially aligned hole in a clutch drum to engage or disengage the plurality of friction plates in the first clutch.

In any of the aspects or combinations of the aspects, the method may further comprise flowing the lubricant from the lubrication channel to a second clutch.

In any of the aspects or combinations of the aspects, the gear may be coupled to a section of a clutch drum radially outward from a plurality of friction plates and where the gear may include a tapered inner surface configured to outflow the lubricant from the wet friction clutch.

In any of the aspects or combinations of the aspects, the first outlet of the lubrication channel may extend radially through a friction disk carrier positioned radially inward from a plurality of friction plates in the wet friction clutch.

In any of the aspects or combinations of the aspects, the lubrication channel may include a second outlet extending through the output shaft adjacent to a one-way clutch.

In any of the aspects or combinations of the aspects, the axle may be a beam axle, the gear assembly may be a planetary gear assembly, and the planetary gear assembly may be directly coupled to the differential without any intervening components positioned therebetween.

In any of the aspects or combinations of the aspects, the differential may be a locking differential configured to rotationally lock and unlock axle shaft sections.

In another representation, a lubrication system is provided for an electric drive axle that comprises a circumferential lubricant conduit bounded between an axle shaft and an output shaft of a gearbox with a planetary gear assembly directly coupled to a differential coupled to a beam axle, the lubrication system further including a radial lubrication conduit extending from the circumferential lubrication conduit into a region radially inward from a plurality of friction disks a wet friction clutch.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various vehicle hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

As used herein, the terms "approximately" and "substantially" are construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a lubrication system in an electric drive axle, comprising:
   flowing a lubricant through a lubrication channel between an outer surface of an axle shaft and an inner surface of an output shaft;
   flowing the lubricant from the lubrication channel to an interior of a first clutch; and
   flowing the lubricant out of the first clutch through a gear coupled to the first clutch;
   where the output shaft is rotationally coupled to a planetary gear assembly; and
   where the planetary gear assembly is directly coupled to a differential.

2. The method of claim 1, where the first clutch is a friction clutch, the gear includes a tapered inner surface, and the lubricant outflows through a conduit formed between the tapered inner surface and a section of a clutch drum positioned radially outward from a plurality of friction plates in the friction clutch.

3. The method of claim 1, further comprising actuating a piston extending through a radially aligned hole in a clutch drum to engage or disengage a plurality of friction plates in the first clutch.

4. The method of claim 1, further comprising flowing the lubricant from the lubrication channel to a second clutch.

* * * * *